United States Patent
Wang et al.

(10) Patent No.: US 9,641,256 B2
(45) Date of Patent: May 2, 2017

(54) OPTICAL COMMUNICATIONS METHOD AND APPARATUS

(71) Applicant: Huawei Technologies Co., Ltd., Shenzhen (CN)

(72) Inventors: Chao Wang, Wuhan (CN); Chunhui Zhang, Wuhan (CN); Lewei Zhang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/975,740

(22) Filed: Dec. 19, 2015

(65) Prior Publication Data

US 2016/0105242 A1 Apr. 14, 2016

Related U.S. Application Data

(63) Continuation of application No. PCT/CN2013/077631, filed on Jun. 21, 2013.

(51) Int. Cl.
*H04J 14/02* (2006.01)
*H04B 10/50* (2013.01)

(52) U.S. Cl.
CPC ........... *H04B 10/50* (2013.01); *H04B 10/506* (2013.01); *H04J 14/02* (2013.01)

(58) Field of Classification Search
CPC ........ H04B 10/50; H04B 10/506; H04J 14/02
See application file for complete search history.

(56) References Cited

U.S. PATENT DOCUMENTS

| | | |
|---|---|---|
| 5,325,224 A | 6/1994 | Lang et al. |
| 6,606,427 B1 | 8/2003 | Graves et al. |
| 6,882,800 B1 | 4/2005 | Graves |
| 2004/0008401 A1 | 1/2004 | Szczepanek et al. |
| 2007/0081223 A1 | 4/2007 | Dorrer et al. |
| 2008/0181605 A1 | 7/2008 | Palacharla et al. |
| 2009/0232497 A1 | 9/2009 | Archambault et al. |
| 2010/0124391 A1 | 5/2010 | Feuer et al. |
| 2012/0057869 A1* | 3/2012 | Colbourne .......... H04J 14/0213 398/49 |

FOREIGN PATENT DOCUMENTS

| | | |
|---|---|---|
| CN | 102291634 A | 12/2011 |
| CN | 102868476 A | 1/2013 |

\* cited by examiner

*Primary Examiner* — Leslie Pascal
(74) *Attorney, Agent, or Firm* — Slater Matsil, LLP

(57) ABSTRACT

An optical communications method and an optical communications apparatus are provided. The method is executed on a communications node that includes an input optical modulator array and an output optical modulator array. The input optical modulator array includes N input optical modulators. The method includes determining at least two local input areas from the input optical modulator array, so that each input optical modulator in each local input area is used to receive a foreign signal light. The method also includes determining at least two local output areas from the output optical modulator array. Each output optical modulator in each local output area is used to send the foreign signal light, and each input optical modulator in a local input area is capable of transmitting the signal light to each output optical modulator in a corresponding local output area.

20 Claims, 8 Drawing Sheets

100

A local communications node determines at least two local input areas from the input optical modulator array, so that each input optical modulator in the at least two local input areas is configured to receive a foreign signal light and the foreign signal light is a signal light that comes from a transmitter-side foreign communications node and needs to be sent to a receiver-side foreign communications node  S110

The local communications node determines at least two local output areas from the output optical modulator array, so that each output optical modulator in the at least two local output areas is configured to send the foreign signal light, where the at least two local input areas correspond to the at least two local output areas in a one-to-one mapping manner, and each input optical modulator in a local input area is capable of transmitting the signal light to each output optical modulator in a corresponding local output area  S120

FIG. 1

OPTICAL COMMUNICATIONS METHOD AND APPARATUS

This application is a continuation of International Application No. PCT/CN2013/077631, filed Jun. 21, 2013, which is hereby incorporated by reference in its entirety.

TECHNICAL FIELD

The present invention relates to the communications field, and in particular, relates to an optical communications apparatus and method.

BACKGROUND

With rapid growth of video and cloud services, operators pay special attention to flexibility of optical network construction and reduction of costs n optical network construction, operation, and maintenance. A network node requires cross-connections in more direction dimensions (or, in other words, transmission paths). By using a reconfigurable optical add/drop multiplexer (ROADM), an operator can perform dimension switching remotely and automatically instead of replacing a fiber connection manually by visiting a site in traditional practices, which meets a requirement for dynamic connections on a network. To meet efficiency and flexibility requirements of a high-speed optical communications network, the ROADM serving as a network cross-connection core needs to develop continuously.

At present, the ROADM switches a direction dimension primarily by using an optical cross connect (OXC). One OXC includes multiple input optical modulators and multiple input optical modulators. Each input optical modulator corresponds to one beam of input signal light, and each output optical modulator corresponds to one beam of output signal light. A cross-connect capability (that is, the number of output optical modulators that can be covered by one input optical modulator, or, in other words, the number of input optical modulators capable of covering one output optical modulator) of the optical modulator, which serves as an core component of the OXC, determines a direction dimension to which the OXC can switch, or, in other words, determines the number of input optical modulators and output optical modulators included in the OXC.

Therefore, the ROADM in the prior art may be unable to meet currently growing network requirements and user requirements due to the limited cross-connect capability of the optical modulator.

SUMMARY

Embodiments of the present invention provide an optical communications method and apparatus, which can enable the number of switchable dimensions to be greater than a cross-connect capability of a single optical modulator, and meet network requirements and user requirements on condition that a structure of the single optical modulator is not changed.

According to a first aspect, an optical communications method is provided, where the method is executed on a communications node that includes an input optical modulator array and an output optical modulator array, where the input optical modulator array includes N input optical modulators and the N input optical modulators are configured to receive a signal light, and the output optical modulator array includes M output optical modulators and the M output optical modulators are configured to send the signal light, where M is greater than the number of output optical modulators that can be covered by one input optical modulator and/or N is greater than the number of input optical modulators capable of covering a same output optical modulator, and the method includes: determining, by a local communications node, at least two local input areas from the input optical modulator array, so that each input optical modulator in the at least two local input areas is used to receive a foreign signal light and the foreign signal light is a signal light that comes from a transmitter-side foreign communications node and needs to be sent to a receiver-side foreign communications node; and determining, by the local communications node, at least two local output areas from the output optical modulator array, so that each output optical modulator in the at least two local output areas is used to send the foreign signal light, where the at least two local input areas correspond to the at least two local output areas in a one-to-one mapping manner, and each input optical modulator in a local input area is capable of transmitting the signal light to each output optical modulator in a corresponding local output area.

With reference to the first aspect, in a first implementation manner of the first aspect, the number of output optical modulators included in the at least two local output areas is greater than the number of output optical modulators that can be covered by one input optical modulator.

With reference to the first aspect and the foregoing implementation manner, in a second implementation manner of the first aspect, the number of input optical modulators included in the at least two local input areas is greater than the number of input optical modulators capable of covering the same output optical modulator.

With reference to the first aspect and the foregoing implementation manner, in a third implementation manner of the first aspect, the method further includes: when a first input optical modulator included in a first local input area of the at least two local input areas receives a first foreign signal light from a first transmitter-side foreign communications node, performing, by the local communications node, control to cause the first input optical modulator to transmit the first foreign signal light to a first output optical modulator included in a first local output area of the at least two local output areas, so that the first output optical modulator transmits the first foreign signal light to a first receiver-side foreign communications node, where the first local output area corresponds to the first local input area, the first transmitter-side foreign communications node is a previous-hop communications node of the local communications node in a transmission path of the first foreign signal light, the first input optical modulator corresponds to the first transmitter-side foreign communications node and a wavelength of the first foreign signal light, the first receiver-side foreign communications node is a next-hop communications node of the local communications node in the transmission path of the first foreign signal light, and the first output optical modulator corresponds to the first receiver-side foreign communications node and the wavelength of the first foreign signal light.

With reference to the first aspect and the foregoing implementation manner, in a fourth implementation manner of the first aspect, the determining, by a local communications node, at least two local input areas from the input optical modulator array, includes: determining, by the local communications node, the at least two local input areas from the input optical modulator array according to the number of dimensions of the transmitter-side foreign communications node and the number of wavelengths of the foreign signal light.

With reference to the first aspect and the foregoing implementation manner, in a fifth implementation manner of the first aspect, the determining, by the local communications node, at least two local output areas from the output optical modulator array, includes: determining, by the local communications node, the at least two local output areas from the output optical modulator array according to the number of dimensions of the receiver-side foreign communications node and the number of wavelengths of the foreign signal light.

With reference to the first aspect and the foregoing implementation manner, in a sixth implementation manner of the first aspect, the method further includes: determining, by the local communications node, a global input area from the input optical modulator array, so that each input optical modulator in the global input area is used to receive an uplink local signal light, where the uplink local signal light is a signal light from the local communications node, and each input optical modulator in the global input area is capable of transmitting the signal light to all output optical modulators in the optical modulator array.

With reference to the first aspect and the foregoing implementation manner, in a seventh implementation manner of the first aspect, the determining, by the local communications node, a global input area from the input optical modulator array, includes: determining, by the local communications node, the global input area from the input optical modulator array according to the number of channels used by the uplink local signal light.

With reference to the first aspect and the foregoing implementation manner, in an eighth implementation manner of the first aspect, the determining, by the local communications node, at least two local output areas from the output optical modulator array, includes: determining, by the local communications node, the at least two local output areas from the output optical modulator array, so that each output optical modulator in the at least two local output areas is used to send the uplink local signal light.

With reference to the first aspect and the foregoing implementation manner, in a ninth implementation manner of the first aspect, the method further includes: when a first uplink local signal light needs to be sent, performing, by the local communications node, control to cause the second input optical modulator to transmit the first uplink local signal light to a second output optical modulator in the output optical modulator array, so that the second output optical modulator transmits the first uplink local signal light to a second receiver-side foreign communications node, where the second input optical modulator corresponds to a channel used by the first uplink local signal light, the second receiver-side foreign communications node is a next-hop communications node of the local communications node in a transmission path of the first uplink local signal light, and the second output optical modulator corresponds to the second receiver-side foreign communications node and a wavelength of the first uplink local signal light.

With reference to the first aspect and the foregoing implementation manner, in a tenth implementation manner of the first aspect, the determining, by the local communications node, at least two local output areas from the output optical modulator array, includes: determining, by the local communications node, the at least two local output areas from the output optical modulator array according to the number of wavelengths of the foreign signal light, the number of wavelengths of the uplink local signal light, and the number of dimensions of the receiver-side foreign communications node.

With reference to the first aspect and the foregoing implementation manner, in an eleventh implementation manner of the first aspect, the method further includes: obtaining, by the local communications node, a first piece of communication status information, where the first piece of communication status information is used to indicate that at least one of the following parameters needs to be changed: the number of wavelengths of the foreign signal light, the number of channels used by the uplink local signal light or the number of dimensions of the transmitter-side foreign communications node; and changing the at least two local input areas and the global input area according to the first piece of communication status information.

With reference to the first aspect and the foregoing implementation manner, in a twelfth implementation manner of the first aspect, the method further includes: determining, by the local communications node, a global output area from the output optical modulator array, so that each output optical modulator in the global output area is used to send a downlink local signal light, where the downlink local signal light is a signal light that needs to be sent to the local communications node, and each output optical modulator in the global output area is capable of receiving the signal light transmitted by all input optical modulators in the optical modulator array.

With reference to the first aspect and the foregoing implementation manner, in a thirteenth implementation manner of the first aspect, the determining, by the local communications node, a global output area from the output optical modulator array, includes: determining, by the local communications node, the global output area from the output optical modulator array according to the number of channels used by the downlink local signal light.

With reference to the first aspect and the foregoing implementation manner, in a fourteenth implementation manner of the first aspect, the determining, by a local communications node, at least two local input areas from the input optical modulator array, includes: determining, by the local communications node, the at least two local input areas from the input optical modulator array, so that each input optical modulator in the at least two local input areas is used to receive the downlink local signal light.

With reference to the first aspect and the foregoing implementation manner, in a fifteenth implementation manner of the first aspect, the method further includes: when a third input optical modulator in the input optical modulator array receives a first downlink local signal light from a second transmitter-side foreign communications node, performing, by the local communications node, control to cause the third input optical modulator to transmit the first downlink local signal light to a third output optical modulator in the global output area; and obtaining the first downlink local signal light from the third output optical modulator, where the second transmitter-side foreign communications node is a previous-hop communications node of the local communications node in a transmission path of the first downlink local signal light, and the third input optical modulator corresponds to the second transmitter-side foreign communications node and a wavelength of the first downlink local signal light, and the third output optical modulator corresponds to a channel used by the first downlink local signal light.

With reference to the first aspect and the foregoing implementation manner, in a sixteenth implementation manner of the first aspect, the determining, by a local communications node, at least two local input areas from the input optical modulator array, includes: determining, by the local communications node, the at least two local input areas from the input optical modulator array according to the number of wavelengths of the foreign signal light, the number of wavelengths of the downlink local signal light, and the number of dimensions of the transmitter-side foreign communications node.

With reference to the first aspect and the foregoing implementation manner, in a seventeenth implementation manner of the first aspect, the method further includes: obtaining, by the local communications node, a second piece of communication status information, where the second piece of communication status information is used to indicate that at least one of the following parameters needs to be changed: the number of wavelengths of the foreign signal light, the number of channels used by the uplink local signal light or the number of dimensions of the receiver-side foreign communications node; and changing the at least two local output areas and the global output area according to the second piece of communication status information.

According to a second aspect, an optical communications apparatus is provided, where the apparatus includes: an input optical modulator array and an output optical modulator array, where the input optical modulator array includes N input optical modulators and the N input optical modulators are configured to receive a signal light, and the output optical modulator array includes M output optical modulators and the M output optical modulators are configured to send the signal light, where M is greater than the number of output optical modulators that can be covered by one input optical modulator and/or N is greater than the number of input optical modulators capable of covering a same output optical modulator; a controller, configured to determine at least two local input areas from the input optical modulator array, so that each input optical modulator in the at least two local input areas is used to receive a foreign signal light and the foreign signal light is a signal light that comes from a transmitter-side foreign communications node and needs to be sent to a receiver-side foreign communications node; and configured to determine at least two local output areas from the output optical modulator array, so that each output optical modulator in the at least two local output areas is used to send the foreign signal light, where the at least two local input areas correspond to the at least two local output areas in a one-to-one mapping manner, and each input optical modulator in a local input area is capable of transmitting the signal light to each output optical modulator in a corresponding local output area.

With reference to the second aspect, in a first implementation manner of the second aspect, the number of output optical modulators included in the at least two local output areas is greater than the number of output optical modulators that can be covered by one input optical modulator.

With reference to the second aspect and the foregoing implementation manner, in a second implementation manner of the second aspect, the number of input optical modulators included in the at least two local input areas is greater than the number of input optical modulators capable of covering the same output optical modulator.

With reference to the second aspect and the foregoing implementation manner, in a third implementation manner of the second aspect, the controller is further configured to: when a first input optical modulator included in a first local input area of the at least two local input areas receives a first foreign signal light from a first transmitter-side foreign communications node, perform control to cause the first input optical modulator to transmit the first foreign signal light to a first output optical modulator included in a first local output area of the at least two local output areas, so that the first output optical modulator transmits the first foreign signal light to a first receiver-side foreign communications node, where the first local output area corresponds to the first local input area, the first transmitter-side foreign communications node is a previous-hop communications node of the local communications node in a transmission path of the first foreign signal light, the first input optical modulator corresponds to the first transmitter-side foreign communications node and a wavelength of the first foreign signal light, the first receiver-side foreign communications node is a next-hop communications node of the local communications node in the transmission path of the first foreign signal light, and the first output optical modulator corresponds to the first receiver-side foreign communications node and the wavelength of the first foreign signal light.

With reference to the second aspect and the foregoing implementation manner, in a fourth implementation manner of the second aspect, the controller is specifically configured to determine the at least two local input areas from the input optical modulator array according to the number of dimensions of the transmitter-side foreign communications node and the number of wavelengths of the foreign signal light.

With reference to the second aspect and the foregoing implementation manner, in a fifth implementation manner of the second aspect, the controller is specifically configured to determine the at least two local output areas from the output optical modulator array according to the number of dimensions of the receiver-side foreign communications node and the number of wavelengths of the foreign signal light.

With reference to the second aspect and the foregoing implementation manner, in a sixth implementation manner of the second aspect, the controller is further configured to determine a global input area from the input optical modulator array, so that each input optical modulator in the global input area is used to receive an uplink local signal light, where the uplink local signal light is a signal light from the local communications node, and each input optical modulator in the global input area is capable of transmitting the signal light to all output optical modulators in the optical modulator array.

With reference to the second aspect and the foregoing implementation manner, in a seventh implementation manner of the second aspect, the controller is specifically configured to determine the global input area from the input optical modulator array according to the number of channels used by the uplink local signal light.

With reference to the second aspect and the foregoing implementation manner, in an eighth implementation manner of the second aspect, the controller is specifically configured to determine the at least two local output areas from the output optical modulator array, so that each output optical modulator in the at least two local output areas is used to send the uplink local signal light.

With reference to the second aspect and the foregoing implementation manner, in a ninth implementation manner of the second aspect, the controller is specifically configured to: when a first uplink local signal light needs to be sent, perform control to cause a second input optical modulator to transmit the first uplink local signal light to a second output optical modulator in the output optical modulator array, so that the second output optical modulator transmits the first uplink local signal light to a second receiver-side foreign communications node, where the second input optical modulator corresponds to a channel used by the first uplink local signal light, the second receiver-side foreign communications node is a next-hop communications node of the local communications node in a transmission path of the first uplink local signal light, and the second output optical modulator corresponds to the second receiver-side foreign communications node and a wavelength of the first uplink local signal light.

With reference to the second aspect and the foregoing implementation manner, in a tenth implementation manner of the second aspect, the controller is specifically configured to determine the at least two local output areas from the output optical modulator array according to the number of wavelengths of the foreign signal light, the number of wavelengths of the uplink local signal light, and the number of dimensions of the receiver-side foreign communications node.

With reference to the second aspect and the foregoing implementation manner, in an eleventh implementation manner of the second aspect, the controller is further configured to obtain, by the local communications node, a first piece of communication status information, where the first piece of communication status information is used to indicate that at least one of the following parameters needs to be changed: the number of wavelengths of the foreign signal light, the number of channels used by the uplink local signal light or the number of dimensions of the transmitter-side foreign communications node; and configured to change the at least two local input areas and the global input area according to the first piece of communication status information.

With reference to the second aspect and the foregoing implementation manner, in a twelfth implementation manner of the second aspect, the controller is further configured to determine a global output area from the output optical modulator array, so that each output optical modulator in the global output area is used to send a downlink local signal light, where the downlink local signal light is a signal light that needs to be sent to the local communications node, and each output optical modulator in the global output area is capable of receiving the signal light transmitted by all input optical modulators in the optical modulator array.

With reference to the second aspect and the foregoing implementation manner, in a thirteenth implementation manner of the second aspect, the controller is specifically configured to determine the global output area from the output optical modulator array according to the number of channels used by the downlink local signal light.

With reference to the second aspect and the foregoing implementation manner, in a fourteenth implementation manner of the second aspect, the controller is specifically configured to determine the at least two local input areas from the input optical modulator array, so that each input optical modulator in the at least two local input areas is used to receive the downlink local signal light.

With reference to the second aspect and the foregoing implementation manner, in a fifteenth implementation manner of the second aspect, the controller is specifically configured to: when a third input optical modulator in the input optical modulator array receives a first downlink local signal light from a second transmitter-side foreign communications node, perform control to cause the third input optical modulator to transmit the first downlink local signal light to a third output optical modulator in the global output area; and obtain the first downlink local signal light from the third output optical modulator, where the second transmitter-side foreign communications node is a previous-hop communications node of the local communications node in a transmission path of the first downlink local signal light, and the third input optical modulator corresponds to the second transmitter-side foreign communications node and a wavelength of the first downlink local signal light, and the third output optical modulator corresponds to a channel used by the first downlink local signal light.

With reference to the second aspect and the foregoing implementation manner, in a sixteenth implementation manner of the second aspect, the controller is specifically configured to determine the at least two local input areas from the input optical modulator array according to the number of wavelengths of the foreign signal light, the number of wavelengths of the downlink local signal light, and the number of dimensions of the transmitter-side foreign communications node.

With reference to the second aspect and the foregoing implementation manner, in a seventeenth implementation manner of the second aspect, the controller is further configured to obtain a second piece of communication status information, where the second piece of communication status information is used to indicate that at least one of the following parameters needs to be changed: the number of wavelengths of the foreign signal light, the number of channels used by the uplink local signal light or the number of dimensions of the receiver-side foreign communications node; and configured to change the at least two local output areas and the global output area according to the second piece of communication status information.

In the optical communications method and apparatus according to the embodiments of the present invention, by enabling an input optical modulator array to include at least two local input areas, enabling an output optical modulator array to include at least two local output areas, enabling each local input area to correspond to each local output area in a one-to-one mapping manner, and enabling each input optical modulator in a local input area to transmit a signal light to each output optical modulator in a corresponding local output area, switchable dimensions in each local input area and each local output area correspond to a cross-connect capability of the optical modulator, and therefore the overall number of switchable dimensions of the apparatus is greater than the cross-connect capability of a single optical modulator, and network requirements and user requirements are met on condition that a structure of the single optical modulator is not changed.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a schematic flowchart of an optical communications method according to an embodiment of the present invention;

DETAILED DESCRIPTION OF ILLUSTRATIVE EMBODIMENTS

Figure 2:
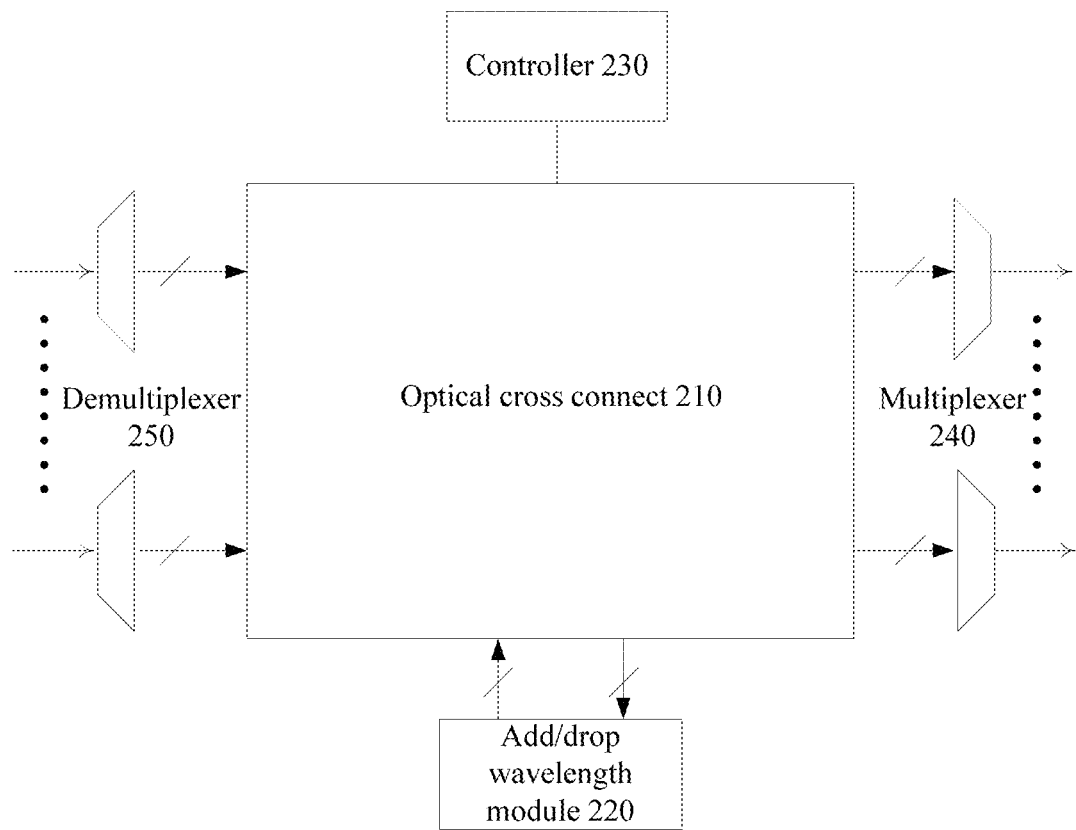
FIG. 2 is a schematic diagram of a system structure of an ROADM, provided by an embodiment of the present invention, to which an optical communications method is applicable.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solution of the present invention is applicable to various communications systems that can use signal light to transmit data, for example, a Global System for Mobile Communications (GSM), a Code Division Multiple Access (CDMA) system, Wideband Code Division Multiple Access (WCDMA), General Packet Radio Service (GPRS), and Long Term Evolution (LTE).

FIG. 1 is a schematic flowchart of an optical communications method 100 according to an embodiment of the present invention. The method 100 is executed on a communications node that includes an input optical modulator array and an output optical modulator array, where the input optical modulator array includes N input optical modulators and the N input optical modulators are configured to receive a signal light, and the output optical modulator array includes M output optical modulators and the M output optical modulators are configured to send the signal light, where M is greater than the number of output optical modulators that can be covered by one input optical modulator and/or N is greater than the number of input optical modulators capable of covering a same output optical modulator. As shown in FIG. 1, the method 100 includes the following steps:

S110. A local communications node determines at least two local input areas from the input optical modulator array, so that each input optical modulator in the at least two local input areas is used to receive a foreign signal light and the foreign signal light is a signal light that comes from a transmitter-side foreign communications node and needs to be sent to a receiver-side foreign communications node.

S120. The local communications node determines at least two local output areas from the output optical modulator array, so that each output optical modulator in the at least two local output areas is used to send the foreign signal light, where the at least two local input areas correspond to the at least two local output areas in a one-to-one mapping manner, and each input optical modulator in a local input area is capable of transmitting the signal light to each output optical modulator in a corresponding local output area.

Specifically, the optical communications method 100 in this embodiment of the present invention is applicable to various apparatuses and devices that use multiple input optical modulators and input optical modulators to switch a direction dimension (or, in other words, a transmission path) of a signal light. A reconfigurable optical add/drop multiplexer (ROADM, Reconfigurable Optical Add/Drop Multiplexer) may be used as an example of the apparatuses and devices. Unless otherwise specified, in the following description, a process in which the optical communications method 100 according to the embodiments of the present invention is applied to the ROADM is used as an example.

The following describes a structure of the ROADM first.

FIG. 2 is a schematic diagram of a system structure of an ROADM, provided by an embodiment of the present invention, to which an optical communications method is applicable. As shown in FIG. 2, an ROADM 200 may include an optical cross connect (OXC) 210, an add/drop wavelength module 220, a controller 230, multiple multiplexers 240, and multiple demultiplexers 250, where the OXC 210, the add/drop wavelength module 220, the multiplexers 240, and the demultiplexers 250 may be connected by fiber jumper.

The multiplexer 240 is configured to multiplex multiple signals (of different wavelengths) from the OXC 210 into a wavelength division multiplexing (WDM) signal, and output the signal to a next-hop node (an example of the receiver-side foreign communications node) of the ROADM.

It should be noted that, in this embodiment of the present invention, a value obtained by multiplying the number of dimensions (or, in other words, direction dimensions) of the receiver-side foreign communications node by the number of wavelengths of the signal light is the same as the number of the multiplexers 240. That is, one multiplexer 240 is configured to transmit a signal light of one wavelength in one dimension. Here the dimensions of the receiver-side foreign communications node specifically refer to the number of a type of nodes under a preset rule (or, in other words, the number of fibers connected to the ROADM), where the nodes can connect to the ROADM for communication, and the preset rule may be area-specific, for example, specific to a city level, a province level, or a country level; or may be entity-specific, for example, a receiver-side foreign communications node is a dimension or a group of receiver-side foreign communications nodes is a dimension.

It should be understood that the dimension sorting manners listed above are merely exemplary, and the present invention is not specially limited thereto, and all other sorting manners capable of differentiating communications nodes shall fall within the protection scope of the present invention.

The demultiplexer 250 demultiplexes a WDM signal from a previous-hop node (a transmitter-side foreign communications node) into multiple signals (of different wavelengths), and outputs the signals to the OXC 210.

Similarly, a value obtained by multiplying the number of dimensions (or, in other words, direction dimensions) of the transmitter-side foreign communications node by the number of wavelengths of the signal light is the same as the number of the demultiplexers 250. That is, one demultiplexer 250 is configured to receive the signal light of one wavelength in one dimension. Here the dimensions of the transmitter-side foreign communications node specifically refer to the number of a type of nodes under a preset rule, where the nodes can connect to the ROADM for communication.

It should be noted that, in this embodiment of the present invention, a basis (the preset rule) for sorting dimensions of the transmitter-side foreign communications node may be the same as or different from that for sorting dimensions of the receiver-side foreign communications node, which is not specially limited by the present invention. Therefore, the number of multiplexers 240 may be the same as or different from the number of demultiplexers 250, which is not specially limited by the present invention.

In addition, in this embodiment of the present invention, the multiplexers 240 and the demultiplexers 250 are connected to fibers, and one fiber is generally connected to one multiplexer or demultiplexer. Therefore, the dimensions of the foreign communications node may be determined according to the number of fibers connected to the ROADM. For example, the number of dimensions of the receiver-side foreign communications node may be the same as the number of input fibers connected to the ROADM.

The add/drop wavelength module 220 includes multiple transmitters and multiple receivers.

The number of the transmitters may be greater than or equal to the number of channels (or, in other words, paths) used by an add-wavelength signal light that needs to be processed by the ROADM apparatus. Here the add-wavelength signal light (that is, uplink local signal light) refers to a signal light sent (by a transmitter) from a local node, where the uplink local signal light may be a signal light sent to a foreign communications node or a signal light sent to a local communications node, which is not specially limited by the present invention. It should be noted that, in this embodiment of the present invention, the channels used by the uplink local signal light may be set arbitrarily. For example, the number of channels used by the uplink local signal light may be the same as the number of wavelengths of the uplink local signal light. That is, one transmitter is configured only to send the uplink local signal lights of one wavelength. Alternatively, a time division multiplexing manner may be used so that one transmitter sends the uplink local signal lights of one wavelength in one time segment but sends the uplink local signal lights of another wavelength in another time segment.

The number of the receivers may be greater than or equal to the number of channels (or, in other words, paths) used by a drop-wavelength signal light that needs to be processed by the ROADM. Here the drop-wavelength signal light (that is, a downlink local signal light) refers to a signal light that is received (by a receiver) and needs to be sent to a local node, where the downlink local signal light may be a signal light sent by a foreign communications node or a signal light sent by a local communications node, which is not specially limited by the present invention. It should be noted that, in this embodiment of the present invention, the channels used by the downlink local signal light may be set arbitrarily. For example, the number of channels used by the downlink local signal light may be the same as the number of wavelengths of the downlink local signal light. That is, one receiver is configured only to receive the downlink local signal lights of one wavelength. Alternatively, a time division multiplexing manner may be used so that one receiver receives the downlink local signal lights of one wavelength in one time segment but receives the downlink local signal lights of another wavelength in another time segment.

In this embodiment of the present invention, the transmitter and the receiver may be devices separated from each other, or integrated into a same device, which is not specially limited by the present invention. In addition, some transmitters may be short-circuited to some receivers by using jumpers, so as to implement wavelength conversion for local nodes.

The OXC 210 may include an input fiber array 211, an input microlens array 212, an input spatial optical modulator array (an example of the input optical modulator array) 213, a mirror 214, an output spatial optical modulator array (an example of the output optical modulator array) 215, an output microlens array 216, and an output fiber array 217.

The input fiber array 211 is configured to receive the signal light (from the demultiplexer 250 or the transmitter of the add/drop wavelength module 220). In this embodiment of the present invention, the signal light is provided with multiple dimensions (from different demultiplexers 250 or transmitters) and has different wavelengths. Therefore, the input fiber array 211 has multiple input fiber units, and the number of input fiber units included in the input fiber array 211 is equal to a sum of the number of transmitters of the add/drop wavelength module 220 and a product of multiplying the number of demultiplexers 250 by the number of output wavelengths of a demultiplexer. That is, one input fiber unit is configured only to receive the signal light of one wavelength in one dimension.

The input microlens array 212 is configured to couple and output the signal light, which is output from the input fiber array 211, to the input spatial optical modulator array 213. Similarly, the input microlens array 212 has multiple input microlens units, and the input microlens units correspond to the input fiber units in a one-to-one mapping manner.

The input spatial optical modulator array 213 has multiple input spatial optical modulators (or, in other words, input spatial optical modulator units), and the input microlens units correspond to the input spatial optical modulators in a one-to-one mapping manner. The input spatial optical modulator array 213 is configured to receive a signal light (from the input microlens array 212), and adjust the input spatial optical modulator (an example of the input optical modulator) of the received signal light according to a control command (from the controller 230, whose functions will be detailed later), so as to output the signal light to the mirror 214 and a specified output spatial optical modulator (an example of the output optical modulator) in the output spatial optical modulator array 215.

The mirror 214 is configured to output the signal light (for example, by reflecting) to the output spatial optical modulator array 215. In addition, in this embodiment of the present invention, the mirror 214 may further perform Fourier transformation on an optical signal.

In this embodiment of the present invention, the receiver-side foreign communications node for the signal light has multiple dimensions, or, in other words, the signal light is sent to different multiplexers 250 or receivers. Therefore, the output spatial optical modulator array 215 has multiple output spatial optical modulators (or, in other words, output spatial optical modulator units), and one output spatial optical modulator is configured only to receive and send a signal light of a specified wavelength in one dimension. In addition, the output spatial optical modulator array 215 is configured to: according to a control command (from the controller 230), enable the specified output spatial optical modulator to receive the signal light (from a specified input spatial optical modulator in the input spatial optical modulator array 213), adjust a reflection angle of the signal light, and output the signal light to the microlens array 216.

The output microlens array 216 is configured to couple and output the signal light to the output fiber array 217. Similarly, the output microlens array 216 has multiple output microlens units, and the output microlens units correspond to the output spatial optical modulators in a one-to-one mapping manner.

The output fiber array 217 is configured to receive the signal light from the output microlens array 216, and output the signal light to the multiplexer 240 or the receiver. Similarly, the output fiber array 217 has multiple output fiber units, and the output fiber units correspond to the output microlens units in a one-to-one mapping manner.

That is, in this embodiment of the present invention, the input fiber units, the input microlens units, and the input spatial optical modulators correspond to one another in a one-to-one mapping manner. The output fiber units, the output microlens units, and the output spatial optical modulators correspond to one another in a one-to-one mapping manner.

Integration of the fiber array and the microlens array in this embodiment is also referred to as a collimator lens array.

In this embodiment of the present invention, a demultiplexer or transmitter, an input fiber unit, and an input microlens unit may form an input port in the present invention. Here, it should be noted that a demultiplexer or transmitter may generate signal lights of multiple wavelengths, and therefore the demultiplexers or transmitters corresponding to different input ports may be the same. However, the input fiber unit and the input microlens unit corresponding to one input port are different from those corresponding to another input port.

In addition, a multiplexer or receiver, an output fiber unit, and an output microlens unit may form an output port in the present invention. Here, it should be noted that a multiplexer or receiver may receive signal lights of multiple wavelengths, and therefore the multiplexers or receivers corresponding to different output ports may be the same. However, the output fiber unit and the output microlens unit corresponding to one output port are different from those corresponding to another output port.

It should be understood that the input port and the output port listed above (or, in other words, structures of the input optical modulator array and the output optical modulator array in the ROADM) are merely exemplary, and the present invention is not limited thereto. Other structures shall fall within the protection scope of the present invention provided that a signal light input by a previous-hop communications node (an example of the transmitter-side foreign communications node) can be transmitted to a specified input optical modulator in the input optical modulator array, and enable the input optical modulator to transmit the signal light to a specified output optical modulator in the output optical modulator array, and enable the output optical modulator to transmit the signal light to a next-hop communications node (an example of the receiver-side foreign communications node).

In this embodiment of the present invention, spatial configuration positions of the input fiber array 211, the input microlens array 212, the mirror 214, the output microlens array 216, and the output fiber array 217 in the ROADM may change properly according to a configuration structure of the input spatial optical modulator array 213 and the output spatial optical modulator array 215.

Figure 3:
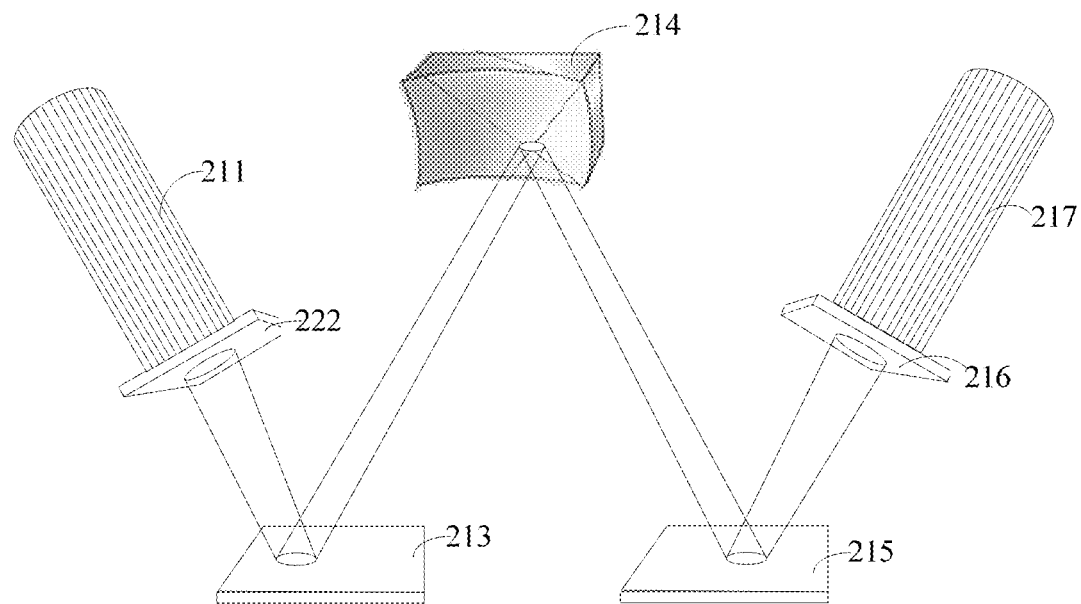
FIG. 3 is a schematic diagram of a configuration structure of an input optical modulator array and an output optical modulator array according to an embodiment of the present invention.

For example, FIG. 3 is a schematic diagram of a configuration structure of an input optical modulator array and an output optical modulator array according to an embodiment of the present invention. As shown in FIG. 3, in this embodiment of the present invention, the input spatial optical modulator array 213 and the output spatial optical modulator array 215 may be configured on a same plane, and the input collimator lens array and the output collimator lens array may be located on both sides of the ROADM.

Figure 4:
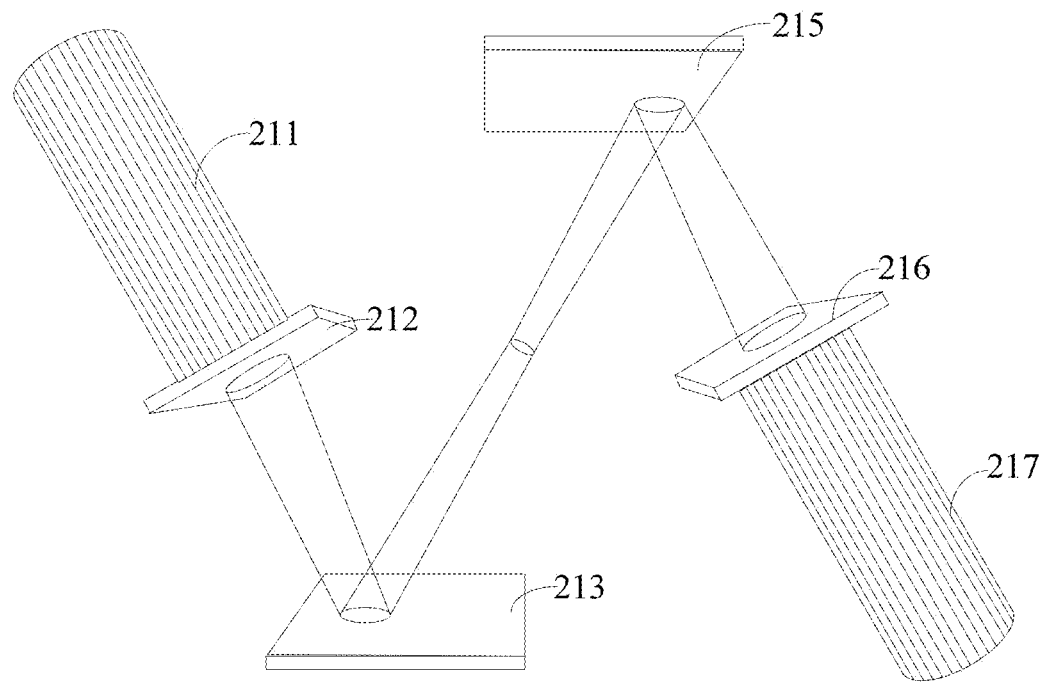
FIG. 4 is a schematic diagram of a configuration structure of an input optical modulator array and an output optical modulator array according to another embodiment of the present invention.

For another example, FIG. 4 is a schematic diagram of a configuration structure of an input optical modulator array and an output optical modulator array according to another embodiment of the present invention. As shown in FIG. 4, according to actual optical path design requirements, the mirror 214 may not be used, but the input spatial optical modulator array 213 is deployed opposite to the output spatial optical modulator array 215, so that the input spatial optical modulator array 213 can output a signal light to the output spatial optical modulator array 215 directly.

Figure 5:
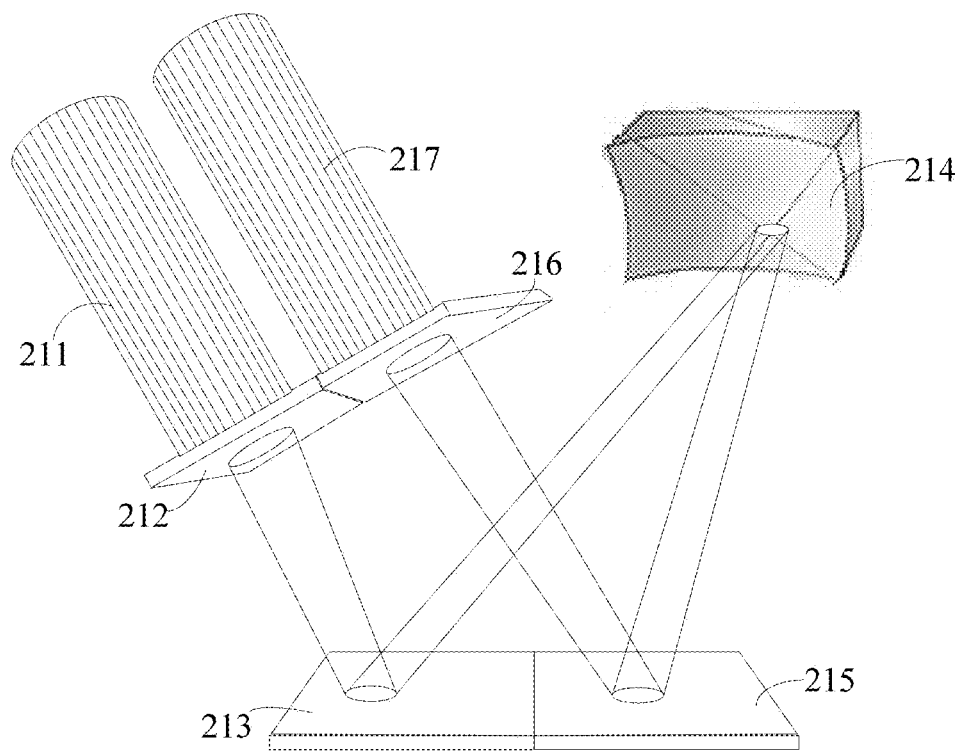
FIG. 5 is a schematic diagram of a configuration structure of an input optical modulator array and an output optical modulator array according to still another embodiment of the present invention.

For another example, FIG. 5 is a schematic diagram of a configuration structure of an input optical modulator array and an output optical modulator array according to still another embodiment of the present invention. As shown in FIG. 5, the mirror 214 may be used so that hardware configuration is interchangeable between an input side and an output side. That is, the input collimator lens array and the output collimator lens array are located on the same side of the ROADM, and an emergent direction of the signal light of the input collimator lens array is parallel to an incident direction of the signal light of the output collimator lens array.

In addition, due to reversibility of an optical path, in this embodiment of the present invention, the output port of the OXC may also implement functions of an input port, and the corresponding input port may also implement functions of the output port. Further, the input optical modulator array and the output optical modulator array may also implement functions of each other.

In this embodiment of the present invention, a structure of an input optical modulator (a unit that forms the input optical modulator array) may be the same as or similar to that of an output optical modulator (a unit that forms the output optical modulator array). The following describes an implementation manner of functions by using the input optical modulator as an example.

For example, in this embodiment of the present invention, the input optical modulator may be implemented by using a micro-electro-mechanical system (MEMS, Micro-Electro-Mechanical System) technology. The MEMS technology is a technology of highly integrating a micro-electro-mechanical apparatus and a control circuit in a tiny space on a silicon-based or non-silicon-based material to form a mechatronics device or system, where a geometric size or an operation size of the micro-electro-mechanical apparatus is of only a micron, submicron or even nanometer magnitude.

The optical modulator implemented by using the MEMS technology uses an electrostatic force or another control force to cause mechanical motion of a micromirror, so that a beam that hits the micromirror deflects to any direction. In a case in which the optical modulator of the present invention is implemented by using the MEMS technology, the controller may use a control instruction to control a micromechanical structure and drive the optical modulator (microlens) to rotate, so as to deflect the optical path and switch dimensions (or, in other words, transmission paths) of the signal light.

For another example, in this embodiment of the present invention, the input optical modulator may be implemented by using a liquid crystal on silicon (LCoS, Liquid Crystal On Silicon) technology. The LCoS technology achieves a purpose of separating lights by adjusting reflection angles of lights of different wavelengths according to principles of liquid crystal grating. Because no removable part exists, the LCoS technology is rather reliable. The LCoS technology changes the reflection angles by means of refractive index change control of a liquid crystal unit, which facilitates expansion and upgrade. Different channels correspond to different areas of a spatial optical modulator (liquid crystal) array. By adjusting a phase of a flare, a transmission direction of a light is changed, so as to achieve purposes of switching ports and adjusting attenuation.

For another example, in this embodiment of the present invention, the input optical modulator may be implemented by using a liquid crystal (LC, liquid crystal) technology. In the optical modulator implemented by using the LC technology, after an incident light passes through a birefringent crystal, the incident light is divided into two lights of polarization states. After one light passes through a half-wave plate, the polarization states of the two lights are the same, and then the light hits the spatial optical modulator (liquid crystal module). By adjusting a voltage of the birefringent crystal, an arrangement structure of the liquid crystals (angles of internal molecules of the crystals) is changed, and therefore the refractive index of the crystal is changed, and a light source is output as lights from different angles. After the light passes through each layer of a liquid crystal, two directions are available for selection. After the light passes through multiple layers of liquid crystals, multiple optical paths are available for selection.

For another example, in this embodiment of the present invention, the input optical modulator may be implemented by using a digital light processing (DLP) or digital micromirror device (DMD) technology. An internal structure of the optical modulator implemented by using the DMD technology is similar to the internal structure of the optical modulator implemented by using the MEMS technology, and light energy is switched by deflecting the microlens. A difference is that the signal light corresponds to multiple mirrors for reflection. Therefore, multiple microlenses on the spatial optical modulator array need to be coordinated to vibrate, so as to reflect the signal light from the same destination. By using a rotation angle of a mirror array, a reflection direction of the light changes, and a purpose of switching channels is achieved.

It should be understood that the implementation manners of the optical modulators (including the input optical modulator and the output optical modulator) listed above are merely exemplary, and the present invention is not limited thereto, and all other methods and structures capable of deflecting a spatial transmission path of a signal light to multiple directions shall fall within the protection scope of the present invention.

In this embodiment of the present invention, the input optical modulator and the input optical modulator may be controlled by the controller 230 to switch the spatial transmission path of the signal light.

Specifically, in this embodiment of the present invention, a fixed mapping relationship exists between input optical modulators and output optical modulators. That is, for a signal light (mainly foreign signal light), it is appropriate that only one transmission path exists (a next-hop communications node is specified by the system). That is, a source of the light (a previous-hop communications node) may control an input optical modulator to which the signal light is cast (for example, a rotation angle of the input optical modulator), so as to switch the signal light to a specified output optical modulator (corresponding to the next-hop communications node specified by the system).

Alternatively, in this embodiment of the present invention, the controller may also extract data carried in the signal light, and parse the data to obtain a destination address. According to the destination address, the controller controls the input optical modulator to which the signal light is cast (for example, the rotation angle of the input optical modulator), so as to switch the signal light to an output optical modulator corresponding to the destination address (or, in other words, the next-hop communications node).

It should be understood that the abovementioned control performed by the controller 230 on the input optical modulator and the input optical modulator in switching the spatial transmission path of the signal light is merely exemplary, and the present invention is not limited thereto. All other control methods capable of accurately transmitting the signal light to the next-hop communications node fall within the protection scope of the present invention. For example, the controller 230 may control only the input optical modulator (such as the rotation angle), or may control both the input optical modulator (such as the rotation angle) and the output optical modulator (such as the rotation angle).

It should be noted that, in this embodiment of the present invention, the controller 230 may be independent of the OXC 210, and connected to the OXC 210 for communication by using a communications protocol and a communications cable, and may perform control according to a signaling message. Alternatively, the controller 230 may be embedded into the OXC 210, and serve as a microprocessor to control the OXC 210.

In addition, in the prior art, to ensure that the signal light is accurately transmitted to the next-hop communications node, one input optical modulator in the input optical modulator array needs to be capable of covering all output optical modulators in the output optical modulator array (or, in other words, one input optical modulator in the input optical modulator array needs to be capable of transmitting the signal light to all output optical modulators in the modulator array). Therefore, a cross-connect capability of a single optical modulator restricts a size of the optical modulator array, and further restricts a communication capability of the communications node, which cannot meet network requirements and user requirements.

In a case in which an optical communications method 100 of the present invention is used, one input optical modulator does not need to cover all output optical modulators in the output optical modulator array, but needs only to cover the output optical modulators in a corresponding local output area (which will be detailed later). Therefore, a size of the input optical modulator array and a size of the output optical modulator array can be set according to network requirements and user requirements. That is, in this embodiment of the present invention, the number (M) of input optical modulators included in an input optical modulator array is greater than the number of input optical modulators capable of covering one output optical modulator, and the number (N) of output optical modulators included in an output optical modulator array is greater than the number of output optical modulators that can be covered by one input optical modulator.

It should be noted that, in this embodiment of the present invention, the cross-connect capability of the optical modulator (the number of input optical modulators capable of covering one output optical modulator, or the number of output optical modulators that can be covered by one input optical modulator) depends on the technology for implementing the optical modulators and an arrangement manner of the optical modulators in the optical modulator array (for example, an arrangement interval between one another). On condition that the optical modulators have the same cross-connect capability, the technical effects of the present invention are noticeable against the prior art.

The following describes a specific procedure of the optical communications method 100.

In this embodiment of the present invention, a communications node may have only a transit (or transparent transmission) function. That is, the communications node is configured only to send all received signal light to other communications nodes rather than to serve as a destination receiver side of data carried on any received signal light or to generate and send the signal light to other communications nodes proactively, or, in other words, the communications node is equipped with only a multiplexer and a demultiplexer, but is not equipped with a receiver or a transmitter (that is, scenario 1), or the communications node not only has the transit function but may also serve as a source communications node or a destination communications node of the signal light (that is, scenario 2). The following describes actions taken in the foregoing two scenarios.

A first scenario (Scenario 1) will now be described.

Generally, in an ROADM, the number of demultiplexers is the same as the number of multiplexers, that is, the number of dimensions of the transmitter-side foreign communications node is the same as the number of dimensions of the receiver-side foreign communications node, or, in other words, the number of input ports is the same as the number of output ports; in addition, the structure of the input optical modulator is the same as that of the output optical modulator, or, in other words, the cross-connect capability of the input optical modulator (the number of output optical modulators that can be covered by one input optical modulator) is the same as the cross-connect capability of the output optical modulator (the number of input optical modulators capable of covering the same output optical modulator).

The following describes actions taken in this scenario.

The controller 230 may divide an input spatial optical modulator array 213 into multiple non-overlapped local input areas according to a preset rule (a first preset rule).

The controller 230 may divide an output spatial optical modulator array 215 into multiple non-overlapped local output areas according to a preset rule (a second preset rule).

The local input areas correspond to the local output areas in a one-to-one mapping manner. That is, the input optical modulators in a local input area are configured only to transmit a signal light to the output optical modulators in a corresponding local output area. Here, "non-overlapped" means that one input optical modulator belongs to only one local input area, and one output optical modulator belongs to only one local output area.

Optionally, the number of output optical modulators included in the at least two local output areas is greater than the number of output optical modulators that can be covered by one input optical modulator.

In addition, the number of input optical modulators included in the at least two local input areas is greater than the number of input optical modulators capable of covering the same output optical modulator.

Optionally, the determining, by the local communications node, at least two local input areas from the input optical modulator array, includes determining, by the local communications node, the at least two local input areas from the input optical modulator array according to the number of dimensions of the transmitter-side foreign communications node and the number of wavelengths of the foreign signal light.

In addition, the determining, by the local communications node, at least two local output areas from the output optical modulator array, includes determining, by the local communications node, the at least two local output areas from the output optical modulator array according to the number of dimensions of the receiver-side foreign communications node and the number of wavelengths of the foreign signal light.

Specifically, in this embodiment of the present invention, the number and a range of local input areas and local input areas (or, in other words, the number of optical modulators included) may be determined according to the cross-connect capability of an optical modulator, the number of dimensions of the foreign communications node, and the number of wavelengths of the signal light.

For example, if the number of wavelengths used by the signal light (foreign signal light) is 4 (that is, there are 4 wavelengths that are different from one another) and the number of dimensions of the foreign communications node (receiver-side foreign communications node and transmitter-side foreign communications node) is 4 (that is, 4 demultiplexers are arranged); then in theory, the local communications node may receive 4×4 signal lights, and 4×4 input optical modulators are required to receive all the signal lights. Similarly, the local communications node may need to send 4×4 signal lights, and 4×4 output optical modulators are required to send all the signal lights.

In this case, if the cross-connect capability of one optical modulator (specifically, an output optical modulator) is 2×2, which means that one output optical modulator is only capable of receiving the signal lights (2×2 signal lights) transmitted by 2×2 input optical modulators in a specified range and that one input optical modulator is only capable of transmitting the signal lights (2×2 signal lights) to 2×2 output optical modulators in a specified range; then in the prior art, in order to ensure accuracy and reliability of transmission, a size of the input optical modulators can only be 2×2, and a size of the output optical modulators can only be 2×2, which cannot meet network requirements.

By contrast, in this embodiment of the present invention, a size of the input optical modulator array may be set to 4×4, and the input optical modulator array may be divided into 4 local input areas, each of which includes 2×2 input optical modulators.

In addition, correspondingly, the output optical modulator array is also divided into 4 local output areas, each of which includes 2×2 output optical modulators.

Generally, the cross-connect capability of the optical modulator is greater than the number of wavelengths of the signal light or the number of dimensions of the communications node. Therefore, in this embodiment of the present invention, the following division manner may be used:

A first manner (manner 1) will now be described.

Each optical modulator in a local area (local output area or local input area) can be enabled to transmit signal lights of a same wavelength in different dimensions.

For example, signal lights of wavelength a are transmitted in dimensions (4 dimensions) between a local output area a (including 4 output optical modulators) and a local input area a (including 4 input optical modulators); signal lights of wavelength b are transmitted in dimensions (4 dimensions) between a local output area b (including 4 output optical modulators) and a local input area b (including 4 input optical modulators); signal lights of wavelength c are transmitted in dimensions (4 dimensions) between a local output area c (including 4 output optical modulators) and a local input area c (including 4 input optical modulators); and signal lights of wavelength d are transmitted in dimensions (4 dimensions) between a local output area d (including 4 output optical modulators) and a local input area d (including 4 input optical modulators).

The foregoing manner 1 may be intuitively expressed as a port matching manner described in Table 1.

TABLE 1

| Area | Port |
| --- | --- |
| Local input/output area a | Wavelengths 1-4 on demultiplexer 1 or wavelengths 1-4 on multiplexer 1 |
| Local input/output area b | Wavelengths 1-4 on demultiplexer 2 or wavelengths 1-4 on multiplexer 2 |
| Local input/output area c | Wavelengths 1-4 on demultiplexer 3 or wavelengths 1-4 on multiplexer 3 |
| Local input/output area d | Wavelengths 1-4 on demultiplexer 4 or wavelengths 1-4 on multiplexer 4 |

A second manner (manner 2) will now be described.

Each optical modulator in a local area (local output area or local input area) can be enabled to transmit signal lights of different wavelengths in a same dimension.

For example, signal lights of wavelengths (4 wavelengths) are transmitted in a dimension a between the local output area a (including 4 output optical modulators) and the local input area a (including 4 input optical modulators); signal lights of wavelengths (4 wavelengths) are transmitted in a dimension b between the local output area b (including 4 output optical modulators) and the local input area b (including 4 input optical modulators); signal lights of wavelengths (4 wavelengths) are transmitted in a dimension c between the local output area c (including 4 output optical modulators) and the local input area c (including 4 input optical modulators); and signal lights of wavelengths (4 wavelengths) are transmitted in a dimension d between the local output area d (including 4 output optical modulators) and the local input area d (including 4 input optical modulators).

The foregoing manner 2 may be intuitively expressed as a port matching manner described in Table 2.

TABLE 2

| Area | Port |
| --- | --- |
| Local input/output area a | Wavelength 1 on demultiplexers 1-4 or wavelength 1 on multiplexers 1-4 |
| Local input/output area b | Wavelength 2 on demultiplexers 1-4 or wavelength 2 on multiplexers 1-4 |
| Local input/output area c | Wavelength 3 on demultiplexers 1-4 or wavelength 3 on multiplexers 1-4 |
| Local input/output area d | Wavelength 4 on demultiplexers 1-4 or wavelength 4 on multiplexers 1-4 |

It should be understood that the division method listed above is merely exemplary, and the present invention is not limited thereto. For example, the port matching manner for the local input area may be the same as or different from that for the corresponding local output area. For example, the local input area may use the port matching manner described in Table 1 but the local output area may use the port matching manner described in Table 2.

In addition, if the cross-connect capability of the optical modulator is smaller than the number of wavelengths of the signal light or the number of dimensions of the communications node, it is also possible to cause one local area to match only ports of some dimensions and some wavelengths.

Figure 6A:
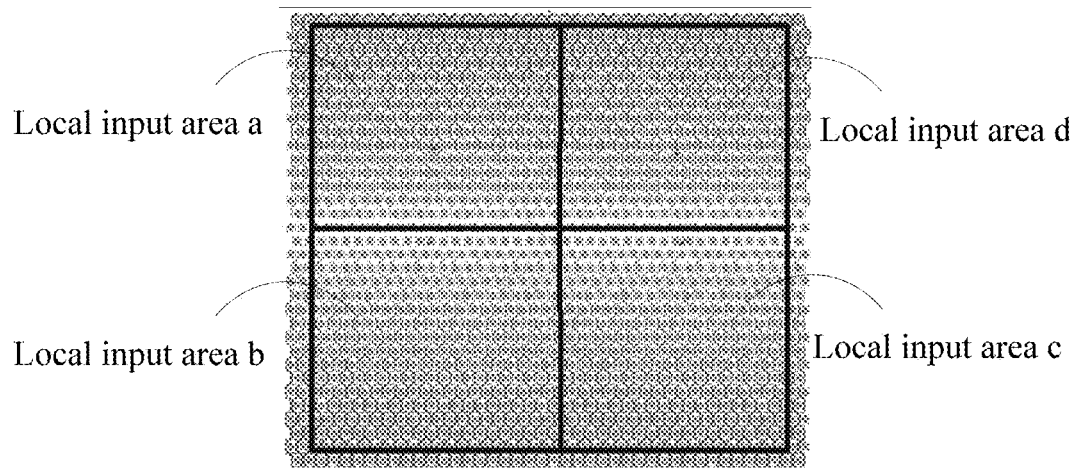
FIG. 6a is a schematic diagram of a division manner for local input areas according to an embodiment of the present invention.
Figure 6B:
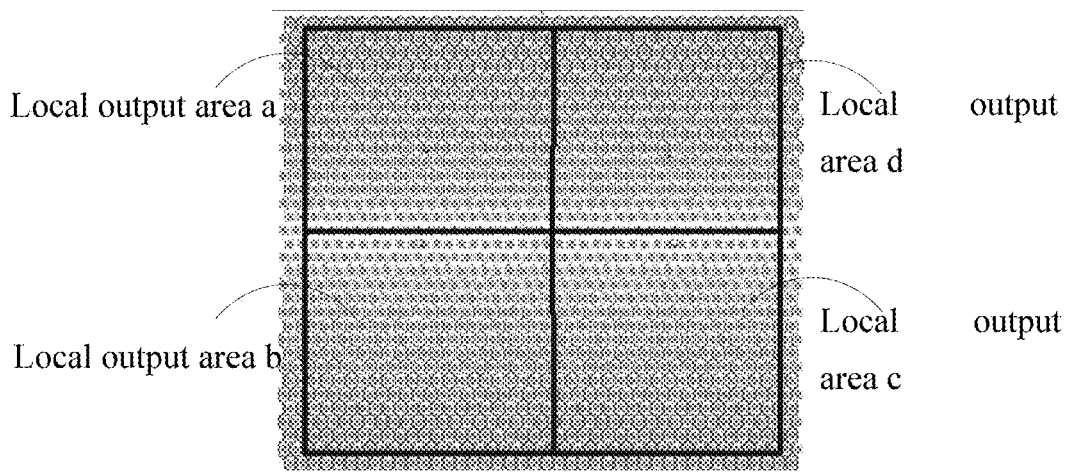
FIG. 6b is a schematic diagram of a division manner for local output areas according to an embodiment of the present invention.

FIG. 6a is a schematic diagram of the foregoing division manner, and FIG. 6b is a schematic diagram of a division manner for a local output area according to an embodiment of the present invention.

As shown in FIG. 6a, the input spatial optical modulator array 213 may be divided into four local input areas, and the output spatial optical modulator array 215 may be divided into four local output areas, where the local input area a corresponds to the local output area a, the local input area b corresponds to the local output area b, the local input area c corresponds to the local output area c, and the local input area d corresponds to the local output area d.

In addition, in this embodiment of the present invention, the following scenarios are not excluded: in an ROADM, the number of demultiplexers is different from the number of multiplexers, that is, the number of dimensions of the transmitter-side foreign communications node is different from the number of dimensions of the receiver-side foreign communications node (or, in other words, the number of input ports is different from the number of output ports); and/or, the cross-connect capability of the input optical modulator (the number of output optical modulators that can be covered by one input optical modulator) is different from the cross-connect capability of the output optical modulator (the number of input optical modulators capable of covering one output optical modulator).

The following describes actions taken in this scenario.

The controller 230 may divide an input spatial optical modulator array 213 into multiple non-overlapped local input areas according to a preset rule (a first preset rule).

The controller 230 may divide an output spatial optical modulator array 215 into multiple non-overlapped local output areas according to a preset rule (a second preset rule).

The local input areas correspond to the local output areas in a one-to-one mapping manner. That is, the input optical modulators in a local input area are configured only to transmit a signal light to the output optical modulators in a corresponding local output area. Here, "non-overlapped" means that one input optical modulator belongs to only one local input area, and one output optical modulator belongs to only one local output area.

Optionally, the first preset rule and the second preset rule are determined according to a first value or a second value, whichever is larger, and according to a third value or a fourth value, whichever is larger, where the first value is a product of the number of dimensions of the transmitter-side foreign communications node and the number of wavelengths of the foreign signal light, the second value is a product of the number of dimensions of the receiver-side foreign communications node and the number of wavelengths of the foreign signal light, the third value is the number of output optical modulators that can be covered by one input optical modulator, and the fourth value is the number of input optical modulators capable of covering one output optical modulator.

Specifically, in this embodiment of the present invention, the number of local input areas needs to be the same as the number of local output areas as a result of division. Therefore, in order to ensure transmission reliability, the number and the range of local input areas and local input areas (or, in other words, the number of optical modulators included) may be determined according to the cross-connect capability of an input optical modulator or the cross-connect capability of an output optical modulator, whichever is smaller, and according to the number of optical modulators required by the input optical modulator array or the number of optical modulators required by the output optical modulator array, whichever is greater.

For example, if the number of wavelengths used by the input signal light (an example of the foreign signal light) is 4 (that is, there are 4 wavelengths that are different from one another) and the number of dimensions of the transmitter-side foreign communications node is 4 (that is, 4 demultiplexers are arranged); then in theory, the local communications node may receive 4×4 signal lights, and 4×4 input optical modulators are required to receive all signal lights.

If the number of wavelengths used by the output signal light (another example of the foreign signal light) is 8 (that is, there are 8 wavelengths that are different from one another) and the number of dimensions of the receiver-side foreign communications node is 8 (that is, 8 multiplexers are arranged); then in theory, the local communications node may need to send 8×8 signal lights, and 8×8 output optical modulators are required to receive all signal lights.

If the cross-connect capability of one output optical modulator is 4×4, that is, one output optical modulator is only capable of receiving the signal lights (4×4 signal lights) transmitted by 4×4 input optical modulators in a specified range, and, if the cross-connect capability of one input optical modulator is 2×2, that is, one input optical modulator is only capable of transmitting the signal lights (2×2 signal lights) to 2×2 output optical modulators in a specified range; then in order to ensure transmission reliability, the output optical modulator array and the input optical modulator array need to be divided into 8×8/2×2=16 areas.

In this case, each local input area of the input optical modulator array includes 2×2 optical modulators. For reasons described above, the local communications node requires 4×4 input optical modulators to receive all signal lights, that is, requires only 4×4/2×2=4 local areas to receive all the signal lights. Therefore, in the input optical modulator array, it is possible that all input optical modulators in the 4 areas match the same input port but match different output ports.

Each local input area of the output optical modulator array includes 2×2 optical modulators. Because the local communications node may receive 4×4 signal lights but need to send 8×8 signal lights, it is possible that in the input optical modulator array, all input optical modulators in the 4 areas match exactly the same input port but match different output ports.

The specific port matching manner is the same as or similar to the manner described in Table 1 or Table 2, which, for avoiding repetition, is not described herein any further.

Optionally, in this embodiment of the present invention, a position of a local input area in the input optical modulator array is consistent with a position of a corresponding local output area in the output optical modulator array.

Specifically, in this embodiment of the present invention, because structures of all optical modulators are consistent, to facilitate transmission of the signal light, the position (relative position) of a local input area in the input optical modulator array may be consistent with the position (relative position) of a corresponding local output area in the output optical modulator array. For example, if a local input area is located in an upper left corner of the input optical modulator array, the corresponding local output area is also located in the upper left corner of the output optical modulator array. Therefore, when the input optical modulator in each local input area transmits a signal light to the output optical modulator in the corresponding local output area, all required adjustments (for example, a microlens deflection angle of the optical modulator) fall within the same range, which facilitates configuration and improves practicality of the optical communications method 100 in this embodiment of the present invention.

Optionally, in this embodiment of the present invention, ranges of the at least two local input areas in the input optical modulator array are consistent, and ranges of the at least two local output areas in the output optical modulator array are consistent.

Specifically, in this embodiment of the present invention, in order that each output optical modulator in the local output area is capable of receiving a signal light transmitted by all input optical modulators in the corresponding local input area, the number of the input optical modulators in the local input area should be smaller than or equal to the cross-connect capability of the output optical modulator. Therefore, the number of input optical modulators in each local input area may be configured according to the number of input ports and the cross-connect capability of the output optical modulator. That is, all local input areas may include the same number of input optical modulators or different numbers of input optical modulators.

However, if the ranges of the local input areas in the input optical modulator array are consistent (or, in other words, all local input areas include the same number of input optical modulators), when a fault occurs in a local input area, the local input area can be replaced by a normal local input area by changing a matched port, which further improves practicality and reliability of the optical communications method 100 in this embodiment of the present invention. Similarly, the ranges of the local output areas in the output optical modulator array may be consistent.

The following describes actions of a local communications node in receiving a signal light sent by a previous-hop communications node and sending the signal light to a next-hop communications node.

Optionally, the method further includes, when a first input optical modulator included in a first local input area of the at least two local input areas receives a first foreign signal light from a first transmitter-side foreign communications node, performing, by the local communications node, control to cause the first input optical modulator to transmit the first foreign signal light to a first output optical modulator included in a first local output area of the at least two local output areas, so that the first output optical modulator transmits the first foreign signal light to a first receiver-side foreign communications node, where the first local output area corresponds to the first local input area, the first transmitter-side foreign communications node is a previous-hop communications node of the local communications node in a transmission path of the first foreign signal light, the first input optical modulator corresponds to the first transmitter-side foreign communications node and a wavelength of the first foreign signal light, the first receiver-side foreign communications node is a next-hop communications node of the local communications node in the transmission path of the first foreign signal light, and the first output optical modulator corresponds to the first receiver-side foreign communications node and the wavelength of the first foreign signal light.

Specifically, in this embodiment of the present invention, each demultiplexer is connected to a fiber, and therefore when a demultiplexer A receives a signal light from a corresponding fiber A, the signal light may be sent directly (by using an input fiber unit A and an input microlens unit A) to a corresponding input optical modulator A (an example of the first input optical modulator). Here, it should be noted that, in this embodiment of the present invention, the local input area in which the input optical modulator A is located corresponds to a wavelength of the signal light and a dimension (such as a direction of a transmission path) of a previous-hop node.

In this case, the controller may, for example, parse data carried in the signal light to obtain a destination communications node of the signal light, and then determine the next-hop communications node of the signal light and an output optical modulator B (an example of the first output optical modulator) corresponding to the next-hop communications node. Here, it should be noted that, in this embodiment of the present invention, the local input area in which the input optical modulator A is located corresponds to the local output area of the output optical modulator B.

Subsequently, the controller may adjust angles of the input optical modulator A and the output optical modulator B (such as an angle of a microlens), and transmit the signal light to the output optical modulator B.

The output optical modulator B transmits the signal light (by using an output microlens unit B and an output fiber unit B) to a corresponding multiplexer B, so that the signal light can be sent to the next-hop communications node by using the fiber B.

A second scenario (Scenario 2) will now be described.

First, the following describes actions of the communications node serving as a source communications node of the signal light (that is, the local communications node is equipped with a transmitter).

Optionally, the method 100 further includes determining, by the local communications node, a global input area from the input optical modulator array, so that each input optical modulator in the global input area is used to receive an uplink local signal light, where the uplink local signal light is a signal light from the local communications node, and each input optical modulator in the global input area is capable of transmitting the signal light to all output optical modulators in the optical modulator array.

Specifically, in this embodiment of the present invention, when the local communications node serves as a source communications node of the signal light, the signal light needs to be transmitted to each output port. Therefore, the input optical modulator (that is, the optical modulator in the global input area) intended for transmitting the signal light (the uplink local signal light) needs to be capable of covering the entire output optical modulator array, and a port that matches the input optical modulator needs to be allocated to the transmitter.

Optionally, in this embodiment of the present invention, the global input area is located at a center of the input optical modulator array.

Specifically, because all optical modulators have a same structure, the input optical modulator located at the center of the input optical modulator array can cover the largest number of output optical modulators. Therefore, in this embodiment of the present invention, the global input area may be arranged at the center of the input optical modulator array.

Optionally, the determining, by the local communications node, a global input area from the input optical modulator array, includes determining, by the local communications node, the global input area from the input optical modulator array according to the number of channels used by the uplink local signal light.

Specifically, in this embodiment of the present invention, the number of the input optical modulators included in the global input area may be determined according to the number of channels (or, in other words, paths) configured for the local communications node to send a signal light, so that one input optical modulator in the global input area obtains the signal light by using only one channel. In addition, in this embodiment of the present invention, a time division multiplexing manner may be used so that one channel can send signal lights of different wavelengths at different times. Therefore, the number of channels may be smaller than or equal to the number of wavelengths of the signal lights sent by the local communications node.

The determining, by the local communications node, at least two local output areas from the output optical modulator array, includes determining, by the local communications node, the at least two local output areas from the output optical modulator array, so that each output optical modulator in the at least two local output areas is configured to send the uplink local signal light.

Specifically, in this embodiment of the present invention, because the local communications node needs to send a signal light to the foreign communications node, each output optical modulator in the determined local output area is further configured to receive the signal light from the global input area, and similarly, the output port corresponding to each output optical modulator is also configured to send the signal light from the global input area.

Figure 7:
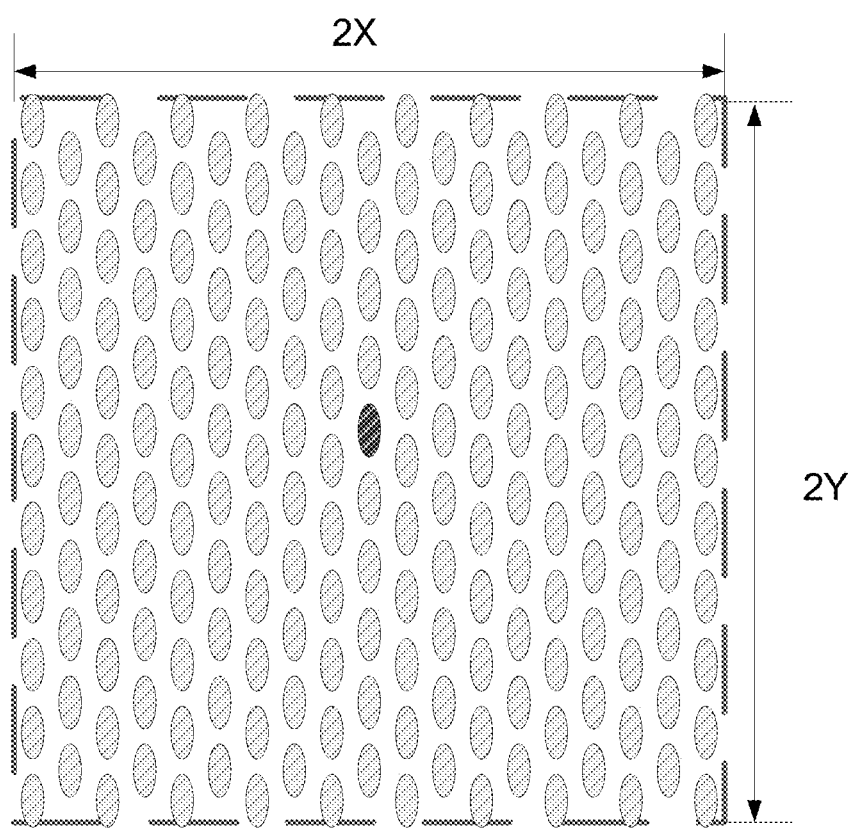
FIG. 7 is a schematic diagram of a cross-connect capability of an optical modulator according to an embodiment of the present invention.

It is assumed that the cross-connect capability of the input optical modulator is X×Y, that is, the input optical modulator is capable of covering 2X output optical modulators in the output optical modulator array in a horizontal direction and covering 2Y output optical modulators in the output optical modulator array in a vertical direction. For example, as shown in FIG. 7, the input optical modulator (for example, position thereof) corresponding to the output optical modulator located at the center of the output optical modulator array (hereinafter referred to as a central output optical modulator) is capable of covering ±X output optical modulators centered on the central output optical modulator in the horizontal direction and covering ±Y spatial optical modulator units centered on the central output optical modulator in the vertical direction, where, it should be noted that "±" in "±X" and "±Y" refers to two opposite directions.

Figure 8A:
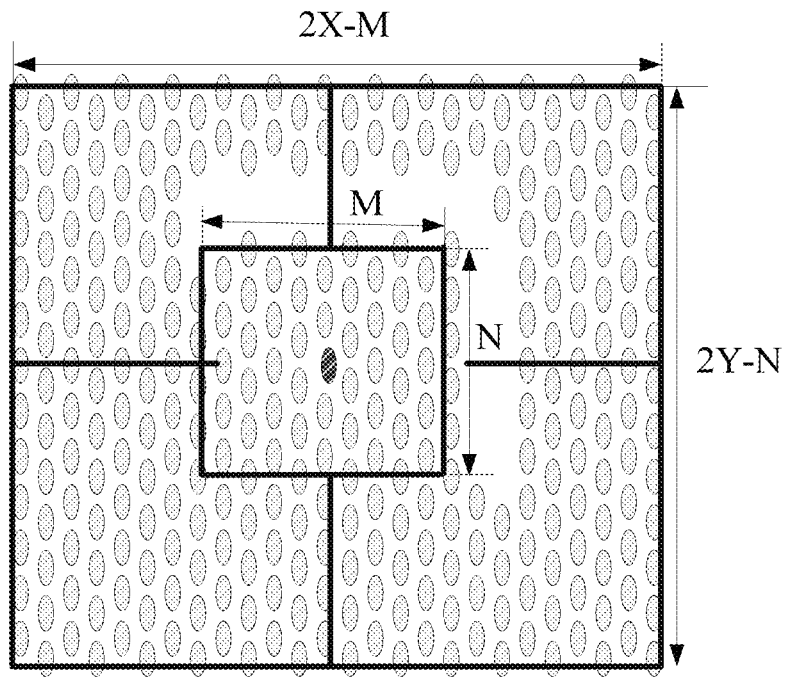
FIG. 8a is a schematic diagram of a division manner for a global input area according to an embodiment of the present invention.

As shown in FIG. 8a, if a size of the global input area is M×N (that is, including M×N input optical modulators, where M≤X, N≤Y), in order that each input optical modulator in the global input area covers all output optical modulators in the output optical modulator array, a maximum size of the output optical modulator array may be (2X−M)×(2Y−N).

The determining, by the local communications node, at least two local output areas from the output optical modulator array, includes determining, by the local communications node, the at least two local output areas from the output optical modulator array according to the number of wavelengths of the foreign signal light, the number of wavelengths of the uplink local signal light, and the number of dimensions of the receiver-side foreign communications node.

Specifically, after the maximum size of the entire output optical modulator array is determined, the output optical modulator array may be divided into local output areas. Because the output optical modulator array also needs to transmit a signal light from the global input area, the actual size of the output optical modulator array needs to take into account the number of wavelengths of the signal light from the global input area. It should be noted that because the global input area is located at the center of the input optical modulator array, the output optical modulator array may, for example, be divided equally into four local output areas with the same range. The manner of matching local input areas and ports may be the same as or similar to the matching manner described in scenario 1, which, for avoiding repetition, is not described herein any further.

It should be understood that the division manner of the local output areas listed above is merely exemplary, and the present invention is not limited thereto, and other division manners are appropriate as long as the range and the size of each local output area satisfy the cross-connect capability of the input optical modulator in the corresponding local input area.

The following describes actions of a local communications node in sending a local signal light to a next-hop communications node.

Optionally, the method further includes, when a first uplink local signal light needs to be sent, performing, by the local communications node, control to cause the second input optical modulator to transmit the first uplink local signal light to a second output optical modulator in the output optical modulator array, so that the second output optical modulator transmits the first uplink local signal light to a second receiver-side foreign communications node, where the second input optical modulator corresponds to a channel used by the first uplink local signal light, the second receiver-side foreign communications node is a next-hop communications node of the local communications node in a transmission path of the first uplink local signal light, and the second output optical modulator corresponds to the second receiver-side foreign communications node and a wavelength of the first uplink local signal light.

Specifically, in this embodiment of the present invention, data that needs to be sent may be encapsulated to generate a signal light. The process thereof may be the same as or similar to the prior art, and, for avoiding repetition, is not described herein any further.

Subsequently, the signal light may be sent by a transmitter over a specified channel, and therefore an input optical modulator C (an example of the second input optical modulator, located in the global input area) corresponding to the channel receives the signal light.

In this case, the controller may, for example, parse data carried in the signal light to obtain a destination communications node of the signal light, and then determine the next-hop communications node of the signal light and an output optical modulator D (an example of the second output optical modulator) corresponding to the next-hop communications node.

Subsequently, the controller may adjust angles of the input optical modulator C and the output optical modulator D (such as an angle of a microlens), and transmit the signal light to the output optical modulator D.

The output optical modulator D transmits the signal light (by using an output microlens unit D and an output fiber unit D) to a corresponding multiplexer D, so that the signal light can be sent to the next-hop communications node by using the fiber D.

Optionally, the method further includes obtaining, by the local communications node, a first piece of communication status information, where the first piece of communication status information is used to indicate that at least one of the following parameters needs to be changed: the number of wavelengths of the foreign signal light, the number of channels used by the uplink local signal light or the number of dimensions of the transmitter-side foreign communications node; and changing the at least two local input areas and the global input area according to the first piece of communication status information.

Specifically, in this embodiment of the present invention, the global input area is capable of covering all output optical modulators in the output optical modulator array. Therefore, the global input area and the local input areas may be adjusted according to a current communication state (an example of the first piece of communication status information). For example, if the number of dimensions of the transmitter-side foreign communications node (a previous-hop communications node) or the number of wavelengths of the foreign signal light increases, a part or all of the input optical modulators in the global input area may be allocated to one or more local input areas.

For example, if the cross-connect capability of both the input optical modulator and the output optical modulator is 12×12, a maximum size of the input optical modulator array is 24×24 when the global input area is set. When the input optical modulator array is divided initially, for example, if the transmitter-side foreign communications node has 4 dimensions, the number of wavelengths of the signal light is 49, and 100 channels are configured for the local communications node; then the input optical modulator array is divided into four local input areas of a 14×14 size and a global input area of a 10×10 size. For example, when the number of wavelengths of the signal light changes from 49 to 64 and only 64 channels need to be configured for the local communications node, the global input area may be reduced to 8×8, and the input optical modulator array is re-divided into four local input areas of a 16×16 size.

It should be understood that the change manner listed above is merely exemplary, and the present invention is not limited thereto. For example, if the local input area includes an input optical modulator capable of covering all output optical modulators in the output optical modulator array, the input optical modulator may also be allocated to the global input area when the number of channels used by the local communications node increases.

According to the optical communications method in this embodiment of the present invention, because a global input area capable of covering the entire output optical modulator array is set, the range of each local input area can be adjusted flexibly according to the network status, user requirements and the like. That is, in a case in which the number of dimensions of the foreign communications node or the number of wavelengths used by the signal light changes, the change can be handled flexibly, which significantly improves practicality of the optical communications method of the present invention.

The following describes actions of the communications node serving as a destination communications node of the signal light (that is, the local communications node is equipped with a receiver).

Optionally, the method 100 further includes determining, by the local communications node, a global output area from the output optical modulator array, so that each output optical modulator in the global output area is used to send a downlink local signal light, where the downlink local signal light is signal light that needs to be sent to the local communications node, and each output optical modulator in the global output area is capable of receiving the signal light transmitted by all input optical modulators in the optical modulator array.

Specifically, in this embodiment of the present invention, when the local communications node serves as a destination communications node of the signal light, the signal light from each input port needs to be transmitted to the receiver. Therefore, the output optical modulator (that is, the optical modulator in a global output area) intended for transmitting the signal light (the downlink local signal light) needs to be capable of covering the entire input optical modulator array, and a port that matches the output optical modulator needs to be allocated to the receiver.

Optionally, in this embodiment of the present invention, the global output area is located at a center of the output optical modulator array.

Specifically, because all optical modulators have a same consistent structure, the output optical modulator located at the center of the output optical modulator array can cover the largest number of input optical modulators. Therefore, in this embodiment of the present invention, the global output area may be arranged at the center of the output optical modulator array.

Optionally, the determining, by the local communications node, a global output area from the output optical modulator array, includes determining, by the local communications node, the global output area from the output optical modulator array according to the number of channels used by the downlink local signal light.

Specifically, in this embodiment of the present invention, the number of the output optical modulators included in the global output area may be determined according to the number of channels (or, in other words, paths) configured for the local communications node to receive a signal light, so that one output optical modulator in the global output area sends the signal light by using only one channel. In addition, in this embodiment of the present invention, a time division multiplexing manner may be used so that one channel can send signal lights of different wavelengths at different times. Therefore, the number of channels may be smaller than or equal to the number of wavelengths of the signal light sent to the local communications node.

Optionally, the determining, by the local communications node, at least two local input areas from the input optical modulator array, includes determining, by the local communications node, the at least two local input areas from the input optical modulator array, so that each input optical modulator in the at least two local input areas is configured to receive the downlink local signal light.

Specifically, in this embodiment of the present invention, because the local communications node needs to receive a signal light sent by the foreign communications node, each input optical modulator in the determined local input area is further configured to send the signal light to the global output area, and similarly, the input port corresponding to each input optical modulator is also configured to send the signal light to the global output area.

It is assumed that the cross-connect capability of the output optical modulator is X'×Y', that is, the output optical modulator is capable of covering 2X' output optical modulators in the output optical modulator array in a horizontal direction and covering 2Y' output optical modulators in the output optical modulator array in a vertical direction. For example, as shown in FIG. 7, the output optical modulator (for example, position thereof) corresponding to the output optical modulator located at the center of the output optical modulator array (hereinafter referred to as a central output optical modulator) is capable of covering ±X' output optical modulators centered on the central output optical modulator in the horizontal direction and covering ±Y' spatial optical modulator units centered on the central output optical modulator in the vertical direction, where, it should be noted that "±" in "±X'" and "±Y'" refers to two opposite directions.

Figure 8B:
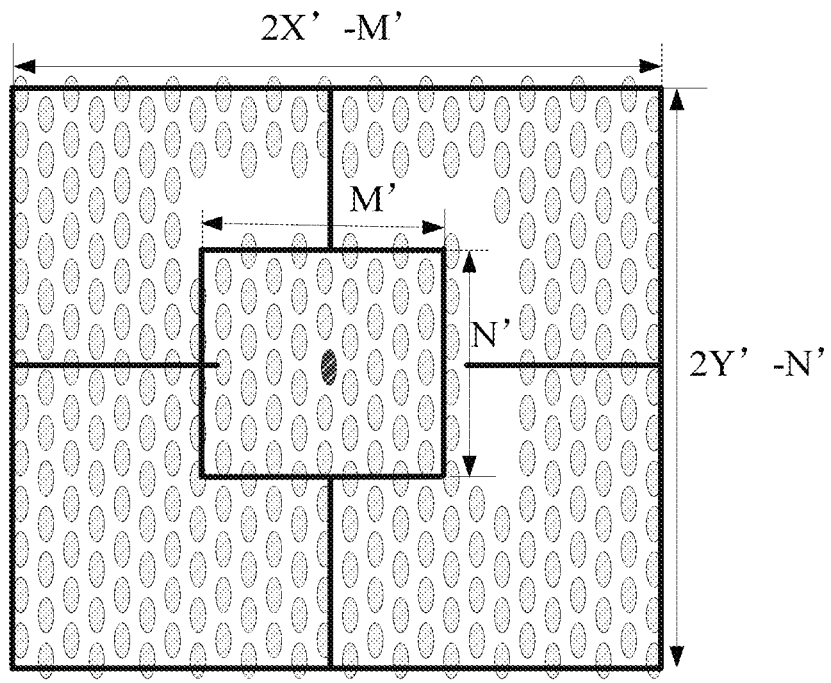
FIG. 8b is a schematic diagram of a division manner for a global output area according to an embodiment of the present invention.

As shown in FIG. 8*b*, if a size of the global output area is M'×N' (that is, including M'×N' output optical modulators, where M'≤X', N'≤Y'), in order that each output optical modulator in the global output area covers all output optical modulators in the output optical modulator array, a maximum size of the output optical modulator array may be (2X'−M')×(2Y'−N').

Optionally, the determining, by the local communications node, at least two local input areas from the input optical modulator array, includes determining, by the local communications node, the at least two local input areas from the input optical modulator array according to the number of wavelengths of the foreign signal light, the number of wavelengths of the downlink local signal light, and the number of dimensions of the transmitter-side foreign communications node.

Specifically, after the maximum size of the entire output optical modulator array is determined, the output optical modulator array may be divided into local output areas. Because the input optical modulator array transmits a signal light to the global output area, the actual size of the input optical modulator array needs to take into account the number of wavelengths of signal light from the global output area. It should be noted that because the global output area is located at the center of the output optical modulator array, the input optical modulator array may, for example, be divided equally into four local input areas with the same range. The manner of matching local input areas and ports may be the same as or similar to the matching manner described in scenario 1, which, for avoiding repetition, is not described herein any further.

It should be understood that the division manner of the local input areas listed above is merely exemplary, and the present invention is not limited thereto, and other division manners are appropriate as long as the range and the size of each local input area satisfy the cross-connect capability of the output optical modulator in the corresponding local output area.

Figure 9:
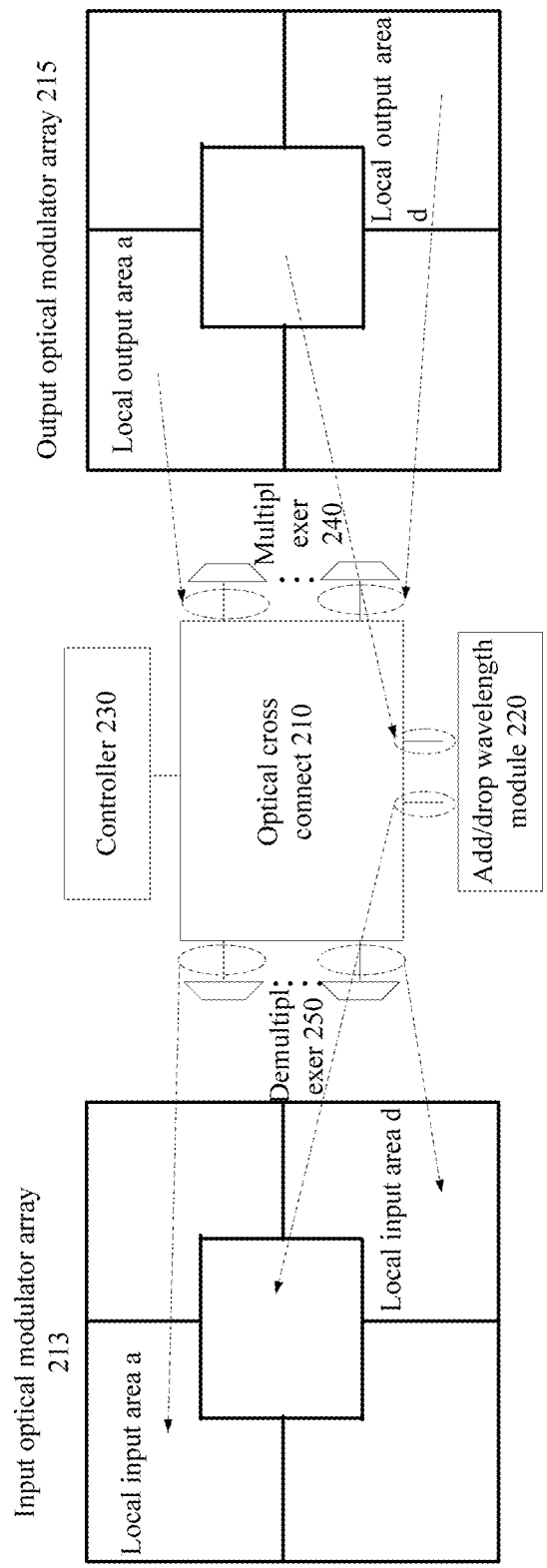
FIG. 9 is a schematic diagram of relationships between each local input area and a global input area and each input port, and relationships between each local output area and a global output area and each output port according to an embodiment of the present invention.

FIG. 9 is a schematic diagram of relationships between each local input area and a global input area and each input port, and relationships between each local output area and a global output area and each output port according to an embodiment of the present invention. As shown in FIG. 9, in this embodiment of the present invention, the global input area may be allocated to each transmitter in an add/drop wavelength module, local input areas may be allocated to demultiplexers respectively, the global input area may be allocated to each receiver in the add/drop wavelength module, and local output areas may be allocated to multiplexers respectively. It should be noted that in FIG. 9, a dotted arrow indicates a transmission path of signal light in an ROADM.

The following describes actions of a local communications node to receive a signal light sent by a previous-hop communications node.

Optionally, the method further includes, when he third input optical modulator in the input optical modulator array receives a first downlink local signal light from a second transmitter-side foreign communications node, performing, by the local communications node, control to enable the third input optical modulator to transmit the first downlink local signal light to a third output optical modulator in the global output area; and obtaining the first downlink local signal light from the third output optical modulator, where the second transmitter-side foreign communications node is a previous-hop communications node of the local communications node in a transmission path of the first downlink local signal light, and the third input optical modulator corresponds to the second transmitter-side foreign communications node and a wavelength of the first downlink local signal light, and the third output optical modulator corresponds to a channel used by the first downlink local signal light.

Specifically, in this embodiment of the present invention, each demultiplexer is connected to each fiber, and therefore, when a demultiplexer E receives signal light from the corresponding fiber E, the signal light may be sent directly (by using an input fiber unit E and an input microlens unit E) to the corresponding input optical modulator E (an example of the third input optical modulator). Here, it should be noted that, in this embodiment of the present invention, the local input area in which the input optical modulator E is located corresponds to a wavelength of the signal light and a dimension (such as a direction of a transmission path) of a previous-hop node.

In this case, the controller may, for example, parse data carried in the signal light to know that the signal light needs to be sent to a local node, and, according to a wavelength of the signal light, determine a channel for transmitting the signal light, and further determine an output optical modulator F (an example of the third output optical modulator) in the global output area to which the signal light needs to be sent.

Subsequently, the controller may adjust angles of the input optical modulator E and the output optical modulator F (such as an angle of a microlens), and transmit the signal light to the output optical modulator F.

The output optical modulator F transmits the signal light (by using an output microlens unit F and an output fiber unit F) to a corresponding receiver, and the receiver may decapsulate the signal light and obtain desired data. The process thereof may be the same as or similar to the prior art, and, for avoiding repetition, is not described herein any further.

Optionally, where determining at least two local input areas from the input optical modulator array, includes determining, by the local communications node, the at least two local input areas from the input optical modulator array according to the number of wavelengths of the foreign signal light, the number of wavelengths of the downlink local signal light, and the number of dimensions of the transmitter-side foreign communications node.

Specifically, in this embodiment of the present invention, the global output area is capable of covering all input optical modulators in the input optical modulator array. Therefore, the global output area and the local output areas may be adjusted according to a current communication state (an example of the second piece of communication status information). For example, if the number of dimensions of the receiver-side foreign communications node (a next-hop communications node) or the number of wavelengths of the foreign signal light increases, a part or all of the output optical modulators in the global output area may be allocated to one or more local output areas.

For example, if the cross-connect capability of both the input optical modulator and the output optical modulator is 12×12, a maximum size of the output optical modulator array is 24×24 when the global output area is set. When the output optical modulator array is divided initially, for example, if the receiver-side foreign communications node has 4 dimensions, the number of wavelengths of the signal light is 49, and 100 channels are configured for the local communications node; then the output optical modulator array is divided into four local output areas of a 14×14 size and a global output area of a 10×10 size. For example, when the number of wavelengths of the signal light changes from 49 to 64 and only 64 channels need to be configured for the local communications node, the global output area may be reduced to 8×8, and the output optical modulator array is re-divided into four local output areas of a 16×16 size.

It should be understood that the change manner listed above is merely exemplary, and the present invention is not limited thereto. For example, if the local output area includes an output optical modulator capable of covering all output optical modulators in the output optical modulator array, the output optical modulator may also be allocated to the global output area when the number of channels used by the local communications node increases.

According to the optical communications method in this embodiment of the present invention, because a global output area capable of covering the entire input optical modulator array is set, the range of each local output area can be adjusted flexibly according to the network status, user requirements and the like. That is, in a case in which the number of dimensions of the foreign communications node or the number of wavelengths used by the signal light changes, the change can be handled flexibly, which significantly improves practicality of the optical communications method of the present invention.

The foregoing has detailed the optical communications method according to the embodiments of the present invention with reference to FIG. 1 to FIG. 9. The following describes in detail an optical communications apparatus according to an embodiment of the present invention with reference to FIG. 10.

Figure 10:
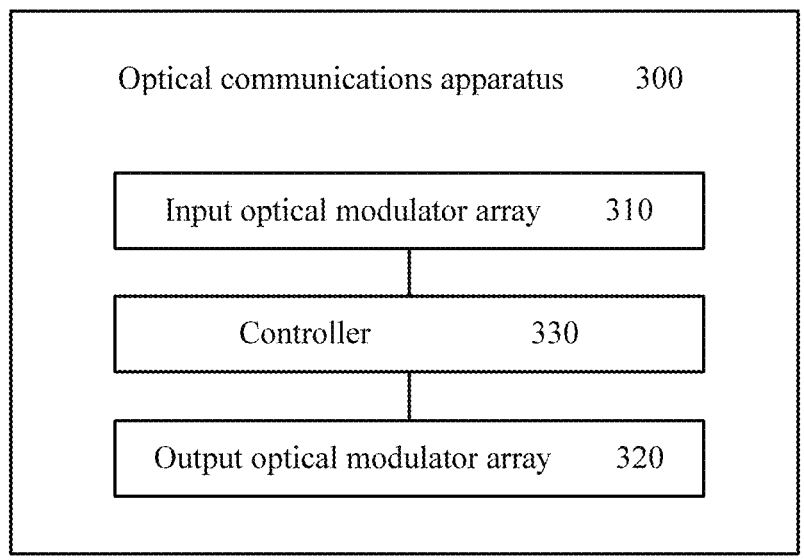
FIG. 10 is a schematic structural diagram of an optical communications apparatus according to an embodiment of the present invention.

FIG. 10 is a schematic block diagram of an optical communications apparatus 300 according to an embodiment of the present invention. As shown in FIG. 10, the apparatus 300 includes an input optical modulator array 310 and an output optical modulator array 320, where the input optical modulator array 310 includes N input optical modulators and the N input optical modulators are configured to receive a signal light, and the output optical modulator array 320 includes M output optical modulators and the M output optical modulators are configured to send the signal light, where M is greater than the number of output optical modulators that can be covered by one input optical modulator and/or N is greater than the number of input optical modulators capable of covering a same output optical modulator.

A controller 330 is configured to determine at least two local input areas from the input optical modulator array 310, so that each input optical modulator in the at least two local input areas is configured to receive foreign signal light and the foreign signal light is signal light that comes from a transmitter-side foreign communications node and needs to be sent to a receiver-side foreign communications node; and configured to determine at least two local output areas from the output optical modulator array 320, so that each output optical modulator in the at least two local output areas is configured to send the foreign signal light, where the at least two local input areas correspond to the at least two local output areas in a one-to-one mapping manner, and each input optical modulator in a local input area is capable of transmitting the signal light to each output optical modulator in a corresponding local output area.

Optionally, the number of output optical modulators included in the at least two local output areas is greater than the number of output optical modulators that can be covered by one input optical modulator.

Optionally, the number of input optical modulators included in the at least two local input areas is greater than the number of input optical modulators capable of covering the same output optical modulator.

Optionally, the controller 330 is further configured to: when a first input optical modulator included in a first local input area of the at least two local input areas receives a first foreign signal light from a first transmitter-side foreign communications node, perform control to cause the first input optical modulator to transmit the first foreign signal light to a first output optical modulator included in a first local output area of the at least two local output areas, so that the first output optical modulator transmits the first foreign signal light to a first receiver-side foreign communications node, where the first local output area corresponds to the first local input area, the first transmitter-side foreign communications node is a previous-hop communications node of the local communications node in a transmission path of the first foreign signal light, the first input optical modulator corresponds to the first transmitter-side foreign communications node and a wavelength of the first foreign signal light, the first receiver-side foreign communications node is a next-hop communications node of the local communications node in the transmission path of the first foreign signal light, and the first output optical modulator corresponds to the first receiver-side foreign communications node and the wavelength of the first foreign signal light.

Optionally, the controller 330 is specifically configured to determine at least two local input areas from the input optical modulator array 310 according to the number of dimensions of the transmitter-side foreign communications node and the number of wavelengths of the foreign signal light.

Optionally, the controller 330 is specifically configured to determine at least two local output areas from the output optical modulator array 320 according to the number of dimensions of the receiver-side foreign communications node and the number of wavelengths of the foreign signal light.

Optionally, the controller 330 is further configured to determine a global input area from the input optical modulator array 310, so that each input optical modulator in the global input area is used to receive an uplink local signal light, where the uplink local signal light is signal light from the local communications node, and each input optical modulator in the global input area is capable of transmitting the signal light to all output optical modulators in the optical modulator array.

Optionally, the controller 330 is specifically configured to determine the global input area from the input optical modulator array 310 according to the number of channels used by the uplink local signal light.

Optionally, the controller 330 is specifically configured to determine at least two local output areas from the output optical modulator array 320, so that each output optical modulator in the at least two local output areas is configured to send the uplink local signal light.

Optionally, the controller 330 is specifically configured to: when a first uplink local signal light needs to be sent, perform control to cause the second input optical modulator to transmit the first uplink local signal light to a second output optical modulator in the output optical modulator array 320, so that the second output optical modulator transmits the first uplink local signal light to a second receiver-side foreign communications node, where the second input optical modulator corresponds to a channel used by the first uplink local signal light, the second receiver-side foreign communications node is a next-hop communications node of the local communications node in a transmission path of the first uplink local signal light, and the second output optical modulator corresponds to the second receiver-side foreign communications node and a wavelength of the first uplink local signal light.

Optionally, the controller 330 is specifically configured to determine at least two local output areas from the output optical modulator array 320 according to the number of wavelengths of the foreign signal light, the number of wavelengths of the uplink local signal light, and the number of dimensions of the receiver-side foreign communications node.

Optionally, the controller 330 is further configured to obtain, by the local communications node, a first piece of communication status information, where the first piece of communication status information is used to indicate that at least one of the following parameters needs to be changed: the number of wavelengths of the foreign signal light, the number of channels used by the uplink local signal light or the number of dimensions of the transmitter-side foreign communications node; and configured to change the at least two local input areas and the global input area according to the first piece of communication status information.

Optionally, the controller 330 is further configured to determine a global output area from the output optical modulator array 320, so that each output optical modulator in the global output area is used to send a downlink local signal light, where the downlink local signal light is signal light that needs to be sent to the local communications node, and each output optical modulator in the global output area is capable of receiving the signal light transmitted by all input optical modulators in the optical modulator array.

Optionally, the controller 330 is specifically configured to determine the global output area from the output optical modulator array 320 according to the number of channels used by the downlink local signal light.

Optionally, the controller 330 is specifically configured to determine at least two local input areas from the input optical modulator array 310, so that each input optical modulator in the at least two local input areas is configured to receive the downlink local signal light.

Optionally, the controller 330 is specifically configured to: when a third input optical modulator in the input optical modulator array 310 receives a first downlink local signal light from a second transmitter-side foreign communications node, perform control to cause the third input optical modulator to transmit the first downlink local signal light to a third output optical modulator in the global output area; and obtain the first downlink local signal light from the third output optical modulator, where the second transmitter-side foreign communications node is a previous-hop communications node of the local communications node in a transmission path of the first downlink local signal light, and the third input optical modulator corresponds to the second transmitter-side foreign communications node and a wavelength of the first downlink local signal light, and the third output optical modulator corresponds to a channel used by the first downlink local signal light.

Optionally, the controller 330 is specifically configured to determine at least two local input areas from the input optical modulator array 310 according to the number of wavelengths of the foreign signal light, the number of wavelengths of the downlink local signal light, and the number of dimensions of the transmitter-side foreign communications node.

Optionally, the controller 330 is further configured to obtain a second piece of communication status information, where the second piece of communication status information is used to indicate that at least one of the following parameters needs to be changed: the number of wavelengths of the foreign signal light, the number of channels used by the uplink local signal light or the number of dimensions of the receiver-side foreign communications node; and configured to change the at least two local output areas and the global output area according to the second piece of communication status information.

The optical communications apparatus 300 (specifically, the controller 350) according to the embodiments of the present invention may correspond to an execution body of the method 100 according to the embodiments of the present invention, and units, that is, modules, in the apparatus 300 and the foregoing and other operations and/or functions are intended for implementing the corresponding procedure in the method 100 in FIG. 1, which, for brevity, is not repeated herein any further.

According to the optical communications apparatus in this embodiment of the present invention, because a global output area capable of covering the entire input optical modulator array is set, the range of each local output area can be adjusted flexibly according to the network status, user requirements and the like. That is, in a case in which the number of dimensions of the foreign communications node or the number of wavelengths used by the signal light changes, the change can be handled flexibly, which significantly improves practicality of the optical communications method of the present invention.

The foregoing has detailed the optical communications method according to the embodiments of the present invention with reference to FIG. 1 to FIG. 9. The following describes in detail an optical communications device according to an embodiment of the present invention with reference to FIG. 11.

Figure 11:
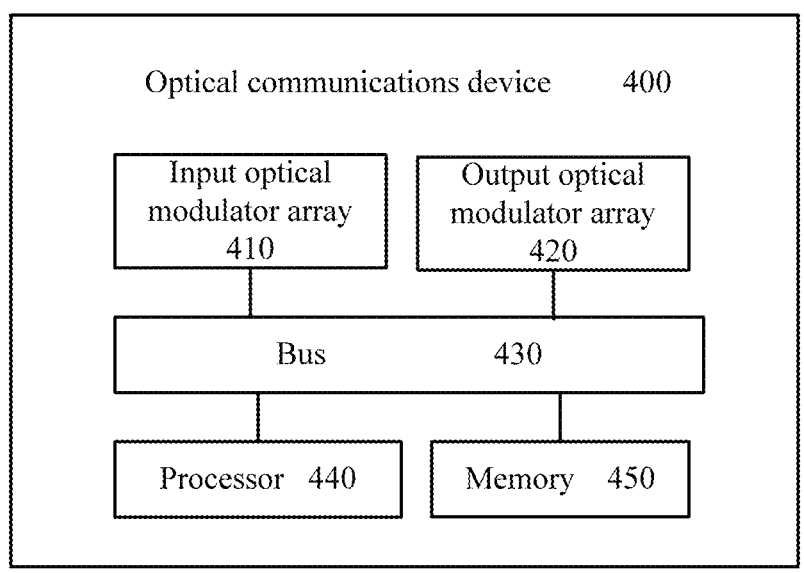
FIG. 11 is a schematic structural diagram of an optical communications device according to an embodiment of the present invention.

FIG. 11 is a schematic block diagram of an optical communications device 400 according to an embodiment of the present invention. As shown in FIG. 11, the device 400 includes an input optical modulator array 410 and an output optical modulator array 420, where the input optical modulator array 410 includes N input optical modulators and the N input optical modulators are configured to receive a signal light, and the output optical modulator array 420 includes M output optical modulators and the M output optical modulators are configured to send the signal light, where M is greater than the number of output optical modulators that can be covered by one input optical modulator and/or N is greater than the number of input optical modulators capable of covering a same output optical modulator. A bus 430 is connected to the input optical modulator array 410 and the output optical modulator array 420. A processor for 40 is connected to the bus. A memory for 450 is connected to the bus.

The processor 440 uses the bus 430 and invokes a program stored in the memory 450 to determine at least two local input areas from the input optical modulator array 410, so that each input optical modulator in the at least two local input areas is configured to receive a foreign signal light and the foreign signal light is a signal light that comes from a transmitter-side foreign communications node and needs to be sent to a receiver-side foreign communications node.

The processor 440 is configured to determine at least two local output areas from the output optical modulator array 420, so that each output optical modulator in the at least two local output areas is configured to send the foreign signal light, where the at least two local input areas correspond to the at least two local output areas in a one-to-one mapping manner, and each input optical modulator in a local input area is capable of transmitting the signal light to each output optical modulator in a corresponding local output area.

Optionally, the number of output optical modulators included in the at least two local output areas is greater than the number of output optical modulators that can be covered by one input optical modulator.

Optionally, the number of input optical modulators included in the at least two local input areas is greater than the number of input optical modulators capable of covering the same output optical modulator.

Optionally, the processor 440 is further configured to: when a first input optical modulator included in a first local input area of the at least two local input areas receives a first foreign signal light from a first transmitter-side foreign communications node, perform control to cause the first input optical modulator to transmit the first foreign signal light to a first output optical modulator included in a first local output area of the at least two local output areas, so that the first output optical modulator transmits the first foreign signal light to a first receiver-side foreign communications node, where the first local output area corresponds to the first local input area, the first transmitter-side foreign communications node is a previous-hop communications node of the local communications node in a transmission path of the first foreign signal light, the first input optical modulator corresponds to the first transmitter-side foreign communications node and a wavelength of the first foreign signal light, the first receiver-side foreign communications node is a next-hop communications node of the local communications node in the transmission path of the first foreign signal light, and the first output optical modulator corresponds to the first receiver-side foreign communications node and the wavelength of the first foreign signal light.

Optionally, the processor 440 is specifically configured to determine at least two local input areas from the input optical modulator array 410 according to the number of dimensions of the transmitter-side foreign communications node and the number of wavelengths of the foreign signal light.

Optionally, the processor 440 is specifically configured to determine at least two local output areas from the output optical modulator array 420 according to the number of dimensions of the receiver-side foreign communications node and the number of wavelengths of the foreign signal light.

Optionally, the processor 440 is further configured to determine a global input area from the input optical modulator array 410, so that each input optical modulator in the global input area is used to receive an uplink local signal light, where the uplink local signal light is a signal light from the local communications node, and each input optical modulator in the global input area is capable of transmitting the signal light to all output optical modulators in the optical modulator array.

Optionally, the processor 440 is specifically configured to determine the global input area from the input optical modulator array 410 according to the number of channels used by the uplink local signal light.

Optionally, the processor 440 is specifically configured to determine at least two local output areas from the output optical modulator array 420, so that each output optical modulator in the at least two local output areas is configured to send the uplink local signal light.

Optionally, the processor 440 is specifically configured to: when a first uplink local signal light needs to be sent, perform control to cause the second input optical modulator to transmit the first uplink local signal light to a second output optical modulator in the output optical modulator array 420, so that the second output optical modulator transmits the first uplink local signal light to a second receiver-side foreign communications node, where the second input optical modulator corresponds to a channel used by the first uplink local signal light, the second receiver-side foreign communications node is a next-hop communications node of the local communications node in a transmission path of the first uplink local signal light, and the second output optical modulator corresponds to the second receiver-side foreign communications node and a wavelength of the first uplink local signal light.

Optionally, the processor 440 is specifically configured to determine at least two local output areas from the output optical modulator array 420 according to the number of wavelengths of the foreign signal light, the number of wavelengths of the uplink local signal light, and the number of dimensions of the receiver-side foreign communications node.

Optionally, the processor 440 is further configured to obtain, by the local communications node, a first piece of communication status information, where the first piece of communication status information is used to indicate that at least one of the following parameters needs to be changed: the number of wavelengths of the foreign signal light, the number of channels used by the uplink local signal light or the number of dimensions of the transmitter-side foreign communications node; and configured to change the at least two local input areas and the global input area according to the first piece of communication status information.

Optionally, the processor 440 is further configured to determine a global output area from the output optical modulator array 420, so that each output optical modulator in the global output area is used to send a downlink local signal light, where the downlink local signal light is a signal light that needs to be sent to the local communications node, and each output optical modulator in the global output area is capable of receiving the signal light transmitted by all input optical modulators in the optical modulator array.

Optionally, the processor 440 is specifically configured to determine the global output area from the output optical modulator array 420 according to the number of channels used by the downlink local signal light.

Optionally, the processor 440 is specifically configured to determine at least two local input areas from the input optical modulator array 410, so that each input optical modulator in the at least two local input areas is configured to receive the downlink local signal light.

Optionally, the processor 440 is specifically configured to: when a third input optical modulator in the input optical modulator array 410 receives a first downlink local signal light from a second transmitter-side foreign communications node, perform control to cause the third input optical modulator to transmit the first downlink local signal light to a third output optical modulator in the global output area; and obtain the first downlink local signal light from the third output optical modulator, where the second transmitter-side foreign communications node is a previous-hop communications node of the local communications node in a transmission path of the first downlink local signal light, and the third input optical modulator corresponds to the second transmitter-side foreign communications node and a wavelength of the first downlink local signal light, and the third output optical modulator corresponds to a channel used by the first downlink local signal light.

Optionally, the processor 440 is specifically configured to determine at least two local input areas from the input optical modulator array 410 according to the number of wavelengths of the foreign signal light, the number of wavelengths of the downlink local signal light, and the number of dimensions of the transmitter-side foreign communications node.

Optionally, the processor 440 is further configured to obtain a second piece of communication status information, where the second piece of communication status information is used to indicate that at least one of the following parameters needs to be changed: the number of wavelengths of the foreign signal light, the number of channels used by the uplink local signal light or the number of dimensions of the receiver-side foreign communications node; and configured to change the at least two local output areas and the global output area according to the second piece of communication status information.

In this embodiment of the present invention, the processor may also be referred to as a CPU. The memory may include a read-only memory and a random access memory, and provides instructions and data to the processor. A part of the memory may also include a non-volatile random access memory (NVRAM). In a specific application, a data transmission device may be embedded into, or itself may be, a standard Ethernet communications device such as a personal computer, and all modules of the data transmission device are coupled together by using a bus system, where the bus system includes not only a data bus, but also includes a power supply bus, a control bus, and a state signal bus.

The processor can implement or execute the steps and logic block diagrams disclosed in the method embodiments of the present invention. The general processor may be a micro processor or the processor may also be any conventional processor, decoder, or the like. The steps of the method disclosed in the embodiments of the present invention may be executed by a hardware processor directly, or by a combination of hardware and software modules in a decoding processor. The software modules may be located in a random access memory, a flash memory, a read-only memory, a programmable read-only memory, an electrically erasable programmable memory, a register, or any other storage medium that is mature in the art. The storage medium is located in the memory. A decoding unit or a processing unit reads information from the memory, and executes the steps of the foregoing methods by using hardware thereof.

It should be understood that, in the embodiments of the present invention, the processor may be a central processing unit (CPU), and the processor may also be another general processor, a digital signal processor (DSP), an application-specific integrated circuit (ASIC), a field-programmable gate array (FPGA), or another programmable logic device, independent gate or transistor logic device, independent hardware component, and so on. The general processor may be a microprocessor or the processor may also be any conventional processor and so on.

During the implementation, all steps of the foregoing method may be completed by an integrated logic circuit of hardware or instructions in software forms in the processor. The steps of the method disclosed in the embodiments of the present invention may be executed by a hardware processor directly, or by a combination of hardware and software modules in the processor. The software modules may be located in a random access memory, a flash memory, a read-only memory, a programmable read-only memory, an electrically erasable programmable memory, a register, or any other storage medium that is mature in the art. The storage medium is located in the memory. The processor reads information from the memory, and executes the steps of the foregoing method in combination with hardware of the processor. To avoid repetition, details are not described herein again.

The optical communications device 400 (specifically, the processor 460) according to the embodiments of the present invention may correspond to an execution body of the method 100 according to the embodiments of the present invention, and units, that is, modules, in the device 300 and the foregoing and other operations and/or functions are intended for implementing the corresponding procedure in the method 100 in FIG. 1, which, for brevity, is not repeated herein any further.

According to the optical communications device in this embodiment of the present invention, because a global output area capable of covering the entire input optical modulator array is set, the range of each local output area can be adjusted flexibly according to the network status, user requirements and the like. That is, in a case in which the number of dimensions of the foreign communications node or the number of wavelengths used by the signal light changes, the change can be handled flexibly, which significantly improves practicality of the optical communications method of the present invention.

It should be understood that the term "and/or" in this specification is only to describe an association relationship of associated objects, and represents that three relationships may exist, for example, A and/or B may represent the following three cases: A exists separately, both A and B exist, and B exists separately. In addition, the character "/" in this specification usually represents that the former and latter objects associated are in an "or" relationship.

It should be understood that in the embodiments of the present invention, the sequence numbers in each process do not represent an execution sequence; the execution sequence of each process should be determined by the function and internal logic of the process, and shall not be construed as a limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An optical communications method, wherein the method is executed on a communications node that comprises an input optical modulator array and an output optical modulator array, wherein the input optical modulator array comprises N input optical modulators and the N input optical modulators are configured to receive a signal light, and the output optical modulator array comprises M output optical modulators and the M output optical modulators are configured to send the signal light, wherein M is greater than a number of output optical modulators that can be covered by one input optical modulator and/or N is greater than a number of input optical modulators capable of covering a same output optical modulator, the method comprising:

determining, by a local communications node, a plurality of local input areas from the input optical modulator array, wherein the local input areas are used to receive a foreign signal light and the foreign signal light is a signal light that comes from a transmitter-side foreign communications node and needs to be sent to a receiver-side foreign communications node; and determining, by the local communications node, a plurality of local output areas from the output optical modulator array, wherein the local output areas are used to send the foreign signal light, wherein the local input areas correspond to the local output areas in a one-to-one mapping manner, and wherein each input optical modulator in a local input area is capable of transmitting a signal light to each output optical modulator in a corresponding local output area.

2. The method according to claim 1, wherein the number of output optical modulators comprised in the plurality of local output areas is greater than the number of output optical modulators that can be covered by one input optical modulator.

3. The method according to claim 1, wherein the number of input optical modulators comprised in the plurality of local input areas is greater than the number of input optical modulators capable of covering the same output optical modulator.

4. The method according to claim 1, wherein a first input optical modulator comprised in a first local input area of the local input areas receives a first foreign signal light from a first transmitter-side foreign communications node;

wherein the method further comprises performing, by the local communications node, control to cause the first input optical modulator to transmit the first foreign signal light to a first output optical modulator comprised in a first local output area of the local output areas, so that the first output optical modulator transmits the first foreign signal light to a first receiver-side foreign communications node;

wherein the first local output area corresponds to the first local input area, the first transmitter-side foreign communications node is a previous-hop communications node of the local communications node in a transmission path of the first foreign signal light;

wherein the first input optical modulator corresponds to the first transmitter-side foreign communications node and a wavelength of the first foreign signal light;

wherein the first receiver-side foreign communications node is a next-hop communications node of the local communications node in the transmission path of the first foreign signal light; and wherein the first output optical modulator corresponds to the first receiver-side foreign communications node and the wavelength of the first foreign signal light.

5. The method according to claim 1, wherein determining the local input areas from the input optical modulator array, comprises determining, by a local communications node, the local input areas from the input optical modulator array according to a number of dimensions of the transmitter-side foreign communications node and a number of wavelengths of the foreign signal light.

6. The method according to claim 1, wherein determining the local output areas from the output optical modulator array comprises determining, by a local communications node, the local output areas from the output optical modulator array according to a number of dimensions of the receiver-side foreign communications node and a number of wavelengths of the foreign signal light.

7. The method according to claim 1, wherein the method further comprises determining, by the local communications node, a global input area from the input optical modulator array, so that each input optical modulator in the global input area is used to receive an uplink local signal light, wherein the uplink local signal light is a signal light from the local communications node, and wherein each input optical modulator in the global input area is capable of transmitting the signal light to all output optical modulators in the output optical modulator array.

8. The method according to claim 7, wherein determining the global input area from the input optical modulator array, comprises determining the global input area from the input optical modulator array according to a number of channels used by the uplink local signal light.

9. The method according to claim 7 wherein determining the local output areas from the output optical modulator array comprises determining the local output areas from the output optical modulator array, so that each output optical modulator in the local output areas is used to send the uplink local signal light.

10. The method according to claim 9, wherein a first uplink local signal light is to be sent;

wherein the method further comprises performing, by the local communications node, control to cause a second input optical modulator to transmit the first uplink local signal light to a second output optical modulator in the output optical modulator array, so that the second output optical modulator transmits the first uplink local signal light to a second receiver-side foreign communications node;

wherein the second input optical modulator corresponds to a channel used by the first uplink local signal light;

wherein the second receiver-side foreign communications node is a next-hop communications node of the local communications node in a transmission path of the first uplink local signal light; and wherein the second output optical modulator corresponds to the second receiver-side foreign communications node and a wavelength of the first uplink local signal light.

11. An optical communications apparatus, comprising:

an input optical modulator array comprising N input optical modulators, the N input optical modulators being configured to receive a signal light;

an output optical modulator array comprising M output optical modulators, the M output optical modulators being configured to send the signal light, wherein M is greater than a number of output optical modulators that can be covered by one input optical modulator and/or N is greater than a number of input optical modulators capable of covering a same output optical modulator;

a controller, configured to
   determine a plurality of local input areas from the input optical modulator array, wherein the local input areas are used to receive a foreign signal light that comprises a signal light that comes from a transmitter-side foreign communications node and needs to be sent to a receiver-side foreign communications node; and
   determine a plurality of local output areas from the output optical modulator array, wherein the local output areas are used to send the foreign signal light, the local input areas corresponding to the local output areas in a one-to-one mapping manner, wherein each input optical modulator in a local input area is capable of transmitting the signal light to each output optical modulator in a corresponding local output area.

12. The apparatus according to claim 11, wherein the number of output optical modulators comprised in plurality of local output areas is greater than the number of output optical modulators that can be covered by one input optical modulator.

13. The apparatus according to claim 11, wherein the number of input optical modulators comprised in the plurality of local input areas is greater than the number of input optical modulators capable of covering the same output optical modulator.

14. The apparatus according to claim 11, wherein, when a first input optical modulator comprised in a first local input area of the plurality of local input areas receives a first foreign signal light from a first transmitter-side foreign communications node, the controller is further configured to perform control to cause the first input optical modulator to transmit the first foreign signal light to a first output optical modulator comprised in a first local output area of the plurality of local output areas, so that the first output optical modulator transmits the first foreign signal light to a first receiver-side foreign communications node, wherein the first local output area corresponds to the first local input area, wherein the first transmitter-side foreign communications node is a previous-hop communications node of the optical communications apparatus in a transmission path of the first foreign signal light, wherein the first input optical modulator corresponds to the first transmitter-side foreign communications node and a wavelength of the first foreign signal light, wherein the first receiver-side foreign communications node is a next-hop communications node of the optical communications apparatus in the transmission path of the first foreign signal light, and wherein the first output optical modulator corresponds to the first receiver-side foreign communications node and the wavelength of the first foreign signal light.

15. The apparatus according to claim 11, wherein the controller is configured to determine the local input areas from the input optical modulator array according to a number of dimensions of the transmitter-side foreign communications node and a number of wavelengths of the foreign signal light.

16. The apparatus according to claim 11, wherein the controller is configured to determine the local output areas from the output optical modulator array according to a number of dimensions of the receiver-side foreign communications node and a number of wavelengths of the foreign signal light.

17. The apparatus according to claim 11, wherein the controller is further configured to determine a global input area from the input optical modulator array, so that each input optical modulator in the global input area is used to receive an uplink local signal light, wherein the uplink local signal light is a signal light from the optical communications apparatus, and wherein each input optical modulator in the global input area is capable of transmitting the signal light to all output optical modulators in the output optical modulator array.

18. The apparatus according to claim 17, wherein the controller is configured to determine the global input area from the input optical modulator array according to a number of channels used by the uplink local signal light.

19. The apparatus according to claim 17, wherein the controller is configured to determine the local output areas from the output optical modulator array, so that each output optical modulator in the plurality of local output areas is used to send the uplink local signal light.

20. The apparatus according to claim 19, wherein, when a first uplink local signal light is to be sent, the controller is configured to perform control to cause a second input optical modulator to transmit the first uplink local signal light to a second output optical modulator in the output optical modulator array, so that the second output optical modulator transmits the first uplink local signal light to a second receiver-side foreign communications node, wherein the second input optical modulator corresponds to a channel used by the first uplink local signal light, the second receiver-side foreign communications node is a next-hop communications node of the optical communications apparatus in a transmission path of the first uplink local signal light, and wherein the second output optical modulator corresponds to the second receiver-side foreign communications node and a wavelength of the first uplink local signal light.

* * * * *